(12) United States Patent
Kimiya et al.

(10) Patent No.: US 6,261,720 B1
(45) Date of Patent: Jul. 17, 2001

(54) POSITIVE ELECTRODE ACTIVE MATERIAL FOR ALKALINE STORAGE BATTERIES

(75) Inventors: Hirokazu Kimiya, Kyoto; Yoichi Izumi, Moriguchi; Hiroyuki Sakamoto; Hidekatsu Izumi, both of Neyagawa; Isao Matsumoto, Osaka, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 08/887,873

(22) Filed: Jul. 3, 1997

(30) Foreign Application Priority Data

Sep. 20, 1996 (JP) ................................................. 8-249496

(51) Int. Cl.$^7$ ...................................................... H01M 4/52
(52) U.S. Cl. ............................................ 429/223; 429/206
(58) Field of Search ...................................... 429/223, 206

(56) References Cited

U.S. PATENT DOCUMENTS

| 4,251,603 | 2/1981 | Matsumoto et al. . |
| 4,898,794 | 2/1990 | Doi et al. . |
| 4,983,474 | 1/1991 | Doi et al. . |

(List continued on next page.)

FOREIGN PATENT DOCUMENTS

| 43 23 007 A1 | 1/1995 | (DE) . |
| 0 696 076 | 2/1996 | (EP) . |
| 0738 017 | 10/1996 | (EP) . |

(List continued on next page.)

OTHER PUBLICATIONS

Oliva, P., et al., "Review Of The Structure And The Electrochemistry Of Nickel Hydroxides And Oxy–Hydroxides," *Journal Of Power Sources*, 8: 229–255 (1982).

Delmas, C., et al., "New High Capacity Hydrated Nickel Hydroxides Electrochemically Stable In KOH Medium," *Proceedings Of The Symposium On Nickel Hydroxide Electrodes*, The Electrchemical Society, Inc., vol. 90–4, pp. 119–133 (1990).

U.S. application No. 08/849,022, Ohta et al., filed May 27, 1997.

U.S. application No. 09/120,544, Okada et al., filed Jul. 22, 1998.

P. Oliva et al., "Review of the Structure and the Electrochemistry of Nickel Hydroxides and Oxy–Hydroxides", *Journal of Power Sources*, vol. 8 (1982), pp. 229–255.

Edited by T. Keily et al., "Power Sources 12", Proceedings: 16th International Power Sources Symposium, 1988.

European Search Report concerning European Patent Application 97 11 1167.9–2111, dated Dec. 11, 1997.

\* cited by examiner

*Primary Examiner*—Carol Chaney
(74) *Attorney, Agent, or Firm*—Akin, Gump, Strauss, Hauer & Feld, L.L.P.

(57) ABSTRACT

Disclosed is a high capacity positive active material for an alkaline storage battery comprising a nickel based multi-metals oxide, wherein the charge characteristic at high temperature is improved. This oxide has a large number of micropores in at least a surface layer. An average composition of the surface layer is different from that of the interior in that at least one element selected from the group consisting of Ca, Ti, Zn, Sr, Ba, Y, Cd, Co, Cr, Bi and lanthanoids, in addition to Ni, is contained in the surface layer, or in that the at least one element is contained at a concentration higher than that of the interior.

19 Claims, 7 Drawing Sheets

U.S. PATENT DOCUMENTS

| | | |
|---|---|---|
| 5,079,110 | 1/1992 | Nakahori et al. . |
| 5,281,494 * | 1/1994 | Ettel et al. .............................. 429/223 |
| 5,344,728 * | 9/1994 | Ovshinsky et al. ................... 429/223 |
| 5,348,822 * | 9/1994 | Ovshinsky et al. ................... 429/223 |
| 5,366,831 | 11/1994 | Watada et al. . |
| 5,466,543 | 11/1995 | Ikoma et al. ............................ 429/59 |
| 5,501,917 | 3/1996 | Hong . |
| 5,506,076 | 4/1996 | Miyamoto et al. ................... 429/223 |
| 5,508,121 | 4/1996 | Sawa ....................................... 429/59 |
| 5,523,182 * | 6/1996 | Ovshinsky et al. ................... 429/223 |
| 5,549,992 | 8/1996 | Iwane et al. ........................... 429/223 |
| 5,567,549 * | 10/1996 | Ovshinsky et al. ................... 429/223 |
| 5,569,562 | 10/1996 | Glemser et al. ...................... 429/223 |
| 5,569,563 * | 10/1996 | Ovshinsky et al. ................... 429/223 |
| 5,599,436 | 2/1997 | Axmann ................................ 205/509 |
| 5,635,313 | 6/1997 | Abe ........................................ 429/223 |
| 5,660,952 * | 8/1997 | Yano et al. ............................ 429/223 |
| 5,670,271 | 9/1997 | Axmann ................................. 429/59 |
| 5,861,225 * | 1/1999 | Corrigan et al. ...................... 429/223 |

FOREIGN PATENT DOCUMENTS

| | | |
|---|---|---|
| 51-122737 | 10/1976 | (JP) . |
| 59-068168 | 4/1984 | (JP) . |
| 61-104565 | 5/1986 | (JP) . |
| 61-37733 | 8/1986 | (JP) . |
| 62-237667 | 10/1987 | (JP) . |
| 62-54235 | 11/1987 | (JP) . |
| 63-152886 | 6/1988 | (JP) . |
| 3-26903 | 4/1991 | (JP) . |
| 3-93161 | 4/1991 | (JP) . |
| 3-50384 | 8/1991 | (JP) . |
| 4-94058 * | 3/1992 | (JP) .............................. H01M/4/32 |
| 4-80513 | 12/1992 | (JP) . |
| 5-021064 | 1/1993 | (JP) . |
| 5-028992 | 2/1993 | (JP) . |
| 7-014578 | 1/1995 | (JP) . |
| 7-073876 | 3/1995 | (JP) . |
| 7-335214 | 12/1995 | (JP) . |
| 8-222215 | 8/1996 | (JP) . |
| 09115543 | 2/1997 | (JP) . |
| 9-050805 | 2/1997 | (JP) . |
| 9-082319 | 3/1997 | (JP) . |
| WO 9411910 | 5/1994 | (WO) . |

POSITIVE ELECTRODE ACTIVE MATERIAL FOR ALKALINE STORAGE BATTERIES

BACKGROUND OF THE INVENTION

The present invention relates to an active material used in a positive electrode for alkaline storage batteries such as nickel-cadmium storage battery, nickel-metal hydride storage battery and the like. More particularly, it relates to an active material comprising a nickel based multi-metals oxide.

Recently, an alkaline storage battery, particularly portable sealed storage battery, has widely been used as a main power source for various portable apparatuses such as communications equipment, business machine, electrical appliance, miscellaneous goods, etc. because it is superior in well-balanced charge/discharge characteristics, cycle life and safety/reliability to other batteries. Also, it has attracted special interest as a large power source, e.g. movable main power source for electric vehicles, etc. because it is extremely superior in charge/discharge characteristic and reliability.

A typical alkaline storage battery is a nickel-cadmium storage battery with a long history. A nickel-metal hydride storage battery using a metal hydride in place of a cadmium negative electrode of this battery has recently been industrialized and a share thereof has rapidly been increased.

In order to improve the energy density and reliability, as in the past, the followings have become extremely important, that is, (1) means for filling a large amount of active materials of positive and negative electrodes in a predetermined volume by realizing light-weight, thin volume, short length and small size of a substrate and additives in an electrode, a separator, an electrolyte, a battery case and a lid member, (2) improvement of various additives and conductive materials, which enhance utilization of an active material, and (3) development of a novel active materials which exhibits high energy density under various use conditions.

Therefore, a recent technical tendency with respect to them will be described hereinafter.

As a main active material of a positive electrode in the industrial nickel-cadmium storage battery and nickel-metal hydride storage battery, a nickel oxide (NiOOH) has hitherto been used. However, as a substrate of the electrode, a network substrate having a higher porosity (e.g. foamed nickel substrate, etc.) has recently been applied in place of a sintered plaque which has been used in a conventional high performance, long cycle life sintered electrode, although the network substrate has a three-dimensional construction. As a result, an electrode wherein the foamed nickel substrate is filled with a large amount of an active material powder (hereinafter referred to as a "foamed metal type electrode") was industrialized, so that the energy density of the nickel electrode was drastically improved (U.S. Pat. No. 4,251,603). An electrode using as a substrate a felt of nickel having the same feature as that of the foamed nickel substrate is also known.

A common advantage of using such high porosity substrate is that a simple producing method capable of directly filling a nickel oxide in the form of paste in the substrate can be used because a pore diameter can be increased unlike the conventional porous sintered substrate. On the other hand, there arose a problem that, since a powder having a large particle diameter is filled in a substrate having a pore diameter larger by far than that of the sintered substrate, influences of low conductivity of the active material powder and decrease in electrical conductivity between the active material and the substrate as a current collector are remarkably exerted, which results in deterioration of the utilization of the active material. Therefore, the conductivity has been compensated by using a method of adding Co or an oxide thereof, Ni, etc., in addition to the active material powder, that is, nickel oxide powder, or still insufficient conductivity has been compensated by incorporating metallic elements other than Ni, such as Co, etc. into the nickel oxide to form a solid solution.

It has been found that the incorporation of other metallic elements into the nickel oxide also results in remarkable improvement in charge efficiency, and incorporation of two elements Co and Cd has a remarkable effect, particularly. Thereafter, Zn having a property which is similar to that of Cd is noted and used as a substitute element for Cd and, furthermore, a solid solution material with three elements Co, Zn and Ba incorporated therein is suggested. The incorporation of other elements into the nickel oxide for the purpose of realizing high efficiency of the charge/discharge characteristic is a technique which has been known for a long time in the sintered electrode. A modification of using a solid solution nickel oxide incorporated with one or more elements selected from Mg, Ca, Ba, Ti, Zr, Mn, Co, Fe, Cu, Sc, Y, etc. is exemplified.

The incorporation of the element such as Co, Cd, Zn, etc. into the nickel oxide has an inhibitory effect on the formation of a highly oxidized compound, i.e. nickel oxyhydroxide of a γ phase during overcharge, in addition to an effect of improving the charge acceptance. Therefore, the incorporation of the above metallic elements was an effective means for realizing long cycle life in the case of applying to a fragile foamed metal type electrode, unlike a fast sintered electrode because volume swelling of the nickel oxide is inhibited (U.S. Pat. No. 5,366,831).

In addition to the improvement of the active material, a shape of the active material is also improved and formed into a spherical shape which is suitable for high density filling and, therefore, it has become possible to use the active material in a practical battery.

The above method of adding Co or an oxide thereof is further improved, and a method of forming a coating layer of $Co(OH)_2$ on the surface of the active material powder or a method of forming a powder layer of a Co oxide has been suggested. These methods aim to realize higher efficiency of the utilization of the active material and to improve the productivity by improving the efficiency of a method of adding a conductive agent.

With the development of these techniques, the charge/discharge efficiency of the active material powder filled in a density which is higher by far than that by a conventional technique can be enhanced to the same level of an excellent sintered electrode. Therefore, the energy density of the positive electrode is remarkably increased and a nickel positive electrode having an energy density of about 600 $mAh/cm^3$ is put into practice at present.

On the other hand, with respect to a negative electrode, the energy density was largely improved by applying a metal hydride ($AB_5$ system) having high capacity density in place of a conventional cadmium negative electrode and, therefore, a negative electrode (per unit volume) having at least twice as much energy density as a positive electrode has been put into practice. In response to this, thinning of a separator, a battery case and other parts has rapidly advanced and the energy density of the battery has been increased.

However, as described above, a demand for improvement in energy density of the battery as a power source for portable apparatus has become greater and greater. In order to realize further improvement in energy density of the battery in response to such a demand, it is strongly required to realize higher energy density and higher performance of the positive electrode related to the development of a technique of realizing higher energy density of the negative electrode.

Furthermore, in view of the recent use, it is further required strongly to realize high energy density, long cycle life and safety at high temperature within the range wider than that in the case of a conventional use, particularly from about 45 to 60° C., with the variation of the use conditions of a portable electronic equipment applied as a power source. The same may be said of a large type movable main power source to which realization of small size and light-weight is required in a severe operating atmosphere.

In a foamed metal type electrode or felt type electrode having an energy density higher than that of the sintered electrode, there is a limit in the restudy of a reduction in metal amount of the substrate and the kind and amount of additives and the filling density of the active material has almost reached the limit. As is generally said, the utilization of the active material in the case of assuming that one electron reaction of Ni is utilized has almost (100%) reached the limit and, therefore, rapid realization of higher energy density can not be desired as the matter stands. From these points of view, in order to realize higher capacity density and higher performance, not only the restudy of the substrate and additives but also the development of the active material itself having epoch-making high energy density are required.

The current active material will be explained in more detail hereinafter. As described above, a material composed mainly of a nickel oxide ($Ni(OH)_2$) is used at present as a positive electrode material of an alkaline storage battery which is industrially used. It is considered that the reaction is mainly one electron reaction between 2 valent and 3 valent of Ni in β-type crystals, as shown below.

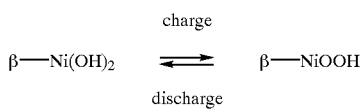

However, in the actual battery, the reaction between about 2.2 valent and about 3.2 valent in an average value may occur (in this case, it is often referred to as a reaction between $β\text{-}Ni(OH)_2$ and β-NiOOH). Anyway, it is a reaction corresponding to approximately one electron. With respect to β-NiOOH in charged state, when charging is conducted under low-temperature atmosphere or charging is conducted for a long period of time, or overcharging is repeated, a part thereof is oxidized to form γ-NiOOH having a higher Ni oxidation state than β-NiOOH. When it is oxidized to form γ-NiOOH, the volume swells and, therefore, the electrode is liable to swell. γ-NiOOH is an electrochemically inert material. Therefore, when γ-NiOOH is formed, there arises a problem that the capacity is reduced and the voltage of the battery is lowered as a result of an increase in overvoltage. Accordingly, a trial of inhibiting the formation of γ-NiOOH has hitherto been made.

Incidentally, it has hitherto been considered that γ-NiOOH is represented by about 3.5 to 3.8 valent of Ni, specifically the chemical formula $A_xH_yNiO_2 \cdot nH_2O$ (an alkali metal A is intercalated between layers composed of Ni and O, thereby to balance a charge between A, H, Ni and O). It is also considered that the valence of Ni is 3.67 or 3.75 and γ-NiOOH is known as a nonstoichiometric compound.

In order to realize higher energy density by using a nickel oxide-based material as the active material of a secondary battery, it is extremely important to make good use of this γ-NiOOH phase, in other words, to find out a material of more than one electron reaction. Therefore, there is a report describing a method of directly forming an $α\text{-}Ni(OH)_2$ phase having a wide interlayer distance (this is in the discharged state, but the interlayer distance is about 8 angstroms close to about 7 angstroms as the interlayer distance of γ-NiOOH in the charged state) other than the $β\text{-}Ni(OH)_2$ phase (most adjacent interlayer distance: about 4.6 angstroms) by incorporating a trivalent metal (e.g. $Al^{3+}$, $Fe^{3+}$, etc.) into a nickel oxide, thereby to form positively charged metal oxide layers, and then incorporating an anion in the metal oxide layers so as to totally balance a charge (e.g. U.S. Pat. No. 5,348,822, etc.).

Such an oxide easily forms γ-NiOOH phase by charging due to the small difference of interlayer distances. Thus in the $α\text{-}Ni(OH)_2/γ\text{-}NiOOH$ reaction system a larger number of electrons per nickel atom are transferred than in the $β\text{-}Ni(OH)_2/β\text{-}NiOOH$ reaction system. However, there arises a problem that the density of the material itself (material density, i.e. tap density) is drastically lowered because of the presence of the $α\text{-}Ni(OH)_2$ whose interlayer distance is much wider than that of $β\text{-}Ni(OH)_2$. Since the tap density has a positive correlation with the filling density upon production of the electrode, high density filling becomes very difficult.

By using this material, there arises a new problem that the cycle life becomes short and the discharge voltage is lowered.

Furthermore, points to which special attention should be paid are as follows. That is, a problem of deterioration of the charge efficiency of the Ni-based oxide at high temperature is not solved at all only by using the above material. High-temperature characteristic is a performance which has recently been regarded as particularly important with the diversification of the use conditions of the battery, and is an object which can not be ignored in view of the utility in the future development of the secondary battery.

The charge efficiency is lowered at high temperature because, when the charge potential of the Ni-based oxide approaches the oxygen evolution potential, oxygen is liable to be evolved in the terminal stage of the charge as a result of the competitive reaction with the charge reaction. Accordingly, there is a suggestion of incorporating or adding an element for increasing the oxygen evolution overvoltage even at high temperature into the nickel oxide in a mediate/large nickel-metal hydride storage battery which easily becomes high temperature in order to improve the charge efficiency at high temperature (U.S. Pat. No. 5,455,125). However, this suggestion was not rooted in a way of thinking about the improvement of the electrode energy density, considering the use of the γ-NiOOH phase. That is, it aimed at the improvement in charge efficiency at high temperature in the charge/discharge reaction between $β\text{-}Ni(OH)_2$ phase and β-NiOOH phase.

The incorporation of the element for increasing the oxygen evolution overvoltage had a drawback that the content of Ni, which mainly supports the charge/discharge reaction, is reduced. Accordingly, it was not insufficient, taking the improvement in energy density into consideration together.

In summary, in order to provide a high energy density, high performance positive electrode for an alkaline storage battery, a novel active material capable of realizing an energy density higher by far than that of a conventional one under various use conditions, particularly use at high temperature, that is, high utilization under high density filling is required. Therefore, it is necessary to improve the following problems.

(1) The material must be a high utilization active material more than one electron reaction in the charge/discharge reaction. That is, with respect to the Ni-based oxide, a higher oxidized compound γ-NiOOH (the oxidation state of Ni is from 3.5 to about 3.8) instead of β-NiOOH (the oxidation state of Ni is about 3.0) of a conventional material should be used as an active material in the charged state.

(2) The active material should be a material which is suitable for high density filling at production of the electrode.

(3) The charge/discharge reaction should be conducted in an efficiency higher than that of a conventional material even at high temperature.

(4) The discharge voltage should be the same as or higher than that of a conventional material even at high rate discharge.

It is important to simultaneously solve all of the above problems. That is, it is necessary to develop a Ni-based oxide capable of filling an active material which exhibits high utilization in high density, and a material having high charge/discharge efficiency.

BRIEF SUMMARY OF THE INVENTION

An object of the present invention is to satisfy the above conditions (1) and (2) and to provide a practical positive electrode material to which the above terms (3) and (4) are imparted.

The present invention provides a positive electrode active material for an alkaline storage battery comprising a nickel based multi-metals oxide, the multi-metals oxide having a large number of micropores in at least a surface layer, wherein an average composition of the surface layer is different from an average composition of the interior, that is, the average composition of the surface layer is different from that of the interior in that at least one metallic element selected from the group consisting of Ca, Ti, Zn, Sr, Ba, Y, Cd, Co, Cr, Bi and lanthanoids, in addition to Ni, is contained in the surface layer, or in that the element is contained at a concentration higher than that of the interior.

In a preferred mode of the present invention, an average amount x of the whole metallic elements except for Ni contained in the surface layer of the nickel based multi-metals oxide is represented by the formula:

$$0.01 \leq x \leq 0.4$$

when the number of atoms of the total metallic elements containing Ni is 1.

In another preferred mode of the present invention, the average composition of the interior is different from that of the surface layer in that at least one element selected from the group consisting of Al, V, Cr, Mn, Fe, Cu, Ge, Zr, Nb, Mo, Ag, Sn, Sb and W, in addition to Ni, is contained in the interior of the oxide except for the surface layer, or in that the element is contained in a concentration higher than that of the surface layer.

In still another preferred mode of the present invention, an average amount y of the whole metallic elements except for Ni contained in the interior of the nickel based multi-metals oxide except for the surface layer is preferably within the range represented by the formula:

$$0.01 \leq y \leq 0.35$$

when the number of atoms of the total metallic elements containing Ni is 1.

The nickel based multi-metals oxide is a solid solution nickel oxide material with a metallic element other than Ni incorporated therein, preferably a nickel hydroxide solid solution. The nickel based multi-metals oxide may be composed of an eutectic crystal of oxides of Ni and the respective metallic element other than Ni.

It is preferred that a large number of micropores of the nickel based multi-metals oxide have an average pore diameter of not more than 200 angstroms and the micropores in the vicinity of the surface layer communicate with each other.

It is preferred that the thickness of the surface layer in the nickel based multi-metals oxide is from 10 to 500 nm.

It is preferred that the nickel based multi-metals oxide is a powder having an average diameter of not more than 100 μm, the powder having a spherical shape or a shape which resembles the spherical shape and having a tap density of not less than 1.5 g/cc. The active material of the present invention is obtained as a powder prepared by a precipitation method, or an active material deposited electrochemically in or on a porous conductive substrate.

The present invention also provides a positive electrode for an alkaline storage battery comprising a conductive supporting member and an active material mixture supported on the conductive supporting member, the active material mixture containing the above active material.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
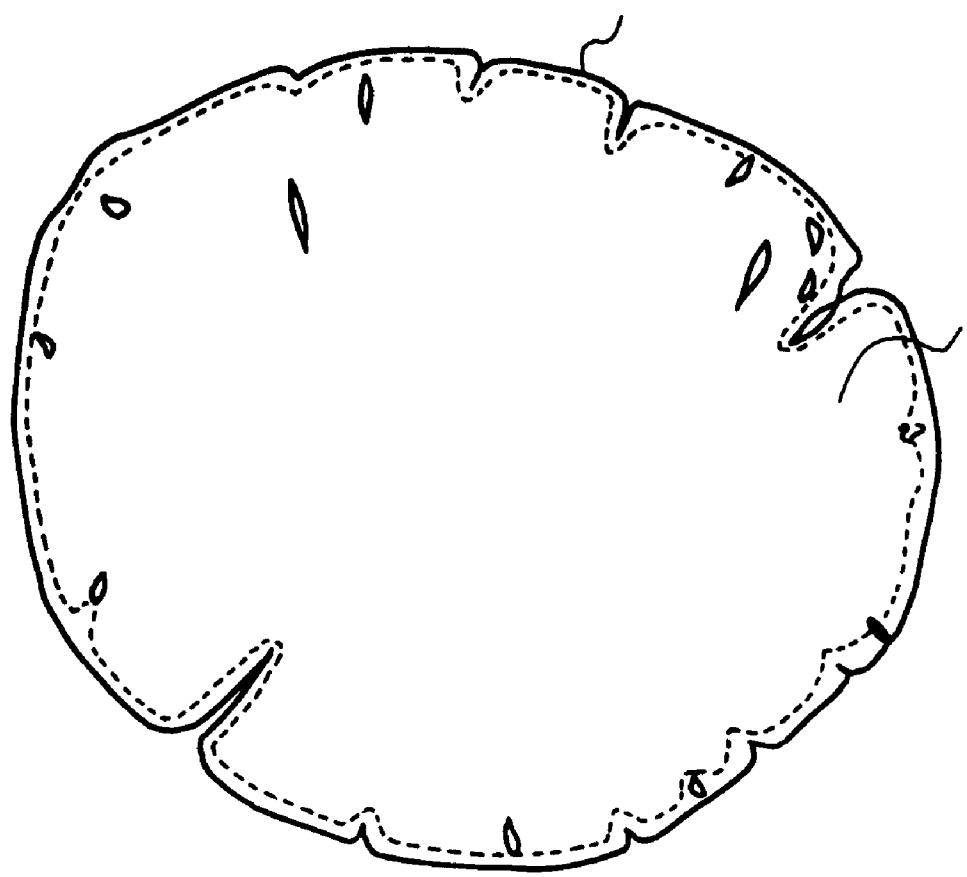
FIG. 1 is a schematic diagram showing an active material powder of the present invention.

The present invention aims at a high energy density electrode, and the improvement was conducted with paying special attention to the followings so as to solve the above-described problems in the nickel electrode.

(1) It is useful to incorporate a certain metallic element other than Ni into the nickel oxide to improve battery performance at high temperature. However, with respect to the effect of increasing the oxygen evolution overvoltage by the incorporation of other elements, the degree of contribution is small at the place other than a solid-liquid interface, that is, the vicinity of the active material surface. Accordingly, when an element other than Ni is incorporated into the whole active material as usual, the effect in proportion to the addition amount is not easily obtained.

Under these circumstances, in the present invention, an element having the above effect is incorporated in the vicinity of the surface layer of the active material powder and the surface layer facing micropores of the powder close to the above place. Alternatively, the addition amount is controlled to a value larger than that of the interior. The present inventors have found that a remarkable effect on improvement of the oxygen evolution potential can be obtained by this construction.

The term "surface layer" used herein means a surface which effectively serves, electrochemically, that is, a region which is about 500 angstroms away from the active material surface in a depth direction. It was confirmed that the remarkable effect on improvement of the oxygen evolution overvoltage is obtained by incorporating the element in this region. This means that a sufficient effect can be obtained by incorporating the element having the effect of improving the oxygen evolution overvoltage only in the surface layer and the same effect can be obtained by incorporating the element in an amount smaller than that of a conventional method of incorporating the element in the whole active material powder. In other words, the effect on improvement of the energy density is also provided so as to prevent a decrease in amount of Ni in the active material for supporting the charge/discharge reaction. As a matter of course, when an expensive element is incorporated, it is extremely effective for reducing the material cost.

Examples of the element having such an action include Ca, Ti, Zn, Ba, Y, Cd, Co, Cr, Bi and lanthanoids. Among them, Ca is easily incorporated into nickel hydroxide to form a solid solution. With respect to the solid solution nickel hydroxide material with Ca incorporated therein, the charge efficiency at high temperature is drastically improved and the utilization is also excellent. Accordingly, Ca is useful as an additive element. Since Ti increases the oxygen evolution potential, it has an effect on improvement of the charge efficiency at high temperature. Co improves not only the charge efficiency at high temperature, but also the conductivity. Accordingly, it is preferably incorporated in combination with other elements. Since a small amount of Y drastically improves the charge efficiency at high temperature, Y is advantageous for increasing the content of Ni.

A suggestion of coating the active material surface with a layer composed only of a metal oxide other than Ni oxide such as Co oxide, Mn oxide, Cd oxide, etc. has recently been made (U.S. Pat. No. 5,523,182). However, this metal oxide layer is not an active material which conducts the redox reaction by itself, but one for securing the conductivity between the active material particles or the active material and the substrate. Therefore, it is disadvantageous as a high energy density material. To the contrary, in the present invention, the surface layer is a part of the active material which conducts the redox reduction by itself and it improves the charge efficiency by increasing the oxygen evolution overvoltage with minimal decrease in Ni content.

(2) It has been considered that γ-NiOOH is inert. However, it has been found that an oxide incorporated with some additive elements is a nickel hydroxide of the β phase in the noncharged state, but forms γ-NiOOH during charge at normal temperature or under high temperature atmosphere and the γ-NiOOH thus formed is easily discharged at the battery voltage within the normal range, thereby to return again to the oxide of the β phase. Such an active material has an advantageous high density at the construction of the electrode and γ-NiOOH which has a higher oxidation state of Ni than the conventional β-NiOOH phase is used during charge/discharge. Accordingly, it is extremely effective for improving the energy density. Incidentally, with respect to some additive elements such as Al, etc., the oxide of the α-phase is slightly formed at the production of the powder. However, it is unstable and disappears if maintained in an alkaline solution for a long time.

Since the incorporation of other elements into the nickel oxide causes a decrease in amount of Ni for supporting the charge/discharge reaction, it is necessary to pay attention to selection of the additive element and optimization of the addition amount so as to realize a higher capacity of the active material so that the decrease in amount of Ni due to incorporation of other elements does not exceed a merit of the improvement in utilization of the active material by using γ-NiOOH. Although it varies depending on the kind of the additive element, when the addition amount is very low or exceeds the solid solubility, it sometimes becomes difficult to obtain an effect on promotion of the formation of γ-NiOOH during charge.

When other elements are incorporated into the nickel oxide, it is useful for improving performances to incorporate a plurality of species of elements. The optimization of the addition amount must be conducted with respect to the whole amount of elements incorporated.

In such way, when using a material which becomes low density during charge, a change in density during charge/discharge becomes large; therefore a problem of the cycle life is likely to take place. This problem can be solved to the degree that nothing interferes in practice, by using a small amount of a binder at the time of production of the electrode and imparting high conductivity to the electrode, as described hereinafter.

Since γ-NiOOH has a discharge potential lower than that of β-NiOOH, when employing the above material using γ-NiOOH as the active material, the discharge voltage of the battery is lowered, which results in decrease in energy density. Accordingly, it is more advantageous to incorporate the additive element more into the interior than the vicinity of the active material surface in order to promote the formation of γ-NiOOH. Examples of the element used for the purpose include Al, V, Cr, Mn, Fe, Cu, Ge, Zr, Nb, Mo and Ag. Among them, since Mn increases the amount of formation of the γ phase which is liable to be discharged than the other elements do, the utilization of the active material is enhanced. Since the β phase is easily synthesized, a high density crystal can be obtained under a suitable condition. Al not only improves the utilization, but also specifically increases the discharge potential. Cr also has an effect on improvement of the charge efficiency at high temperature. Among these elements, an element which is liable to elute, such as Cr, is contained. Accordingly, it is effective that such an element is incorporated into the interior of the active material. Since Al has also an effect on increasing the discharge voltage, it may be incorporated in the vicinity of the surface in a larger amount in comparison with other elements. Also, in this case, if the amount of Al of the surface is larger than that of the interior with respect to the total amount of Al and other elements, the above effect can be obtained. Incidentally, Mn and Fe are cheaper than Ni and, therefore, they also contribute to reduce the material cost.

(3) With the improvement of the energy density, it is extremely effective to use the above means (1) and (2) in combination so as to improve the high rate discharge characteristic and/or charge characteristic at high temperature. That is, the above-described problems can be solved simultaneously by using different materials in the surface and the interior, thereby to impart a different function to them. Therefore, it becomes possible to provide a positive electrode for an alkaline storage battery having high energy density under various use conditions.

(4) With respect to the state of these elements, they are preferably incorporated into the crystal of $Ni(OH)_2$ in view of the action thereof. However, with respect to the element of improving the high-temperature charge characteristic, the effect can be recognized even if it is in an eutectic state.

(5) With respect to the shape of the powder, it is advantageous to form into a spherical powder or a powder having a shape which is close to the spherical shape in order to improve the energy density in view of ease of filling into a two- or three-dimensional metal porous substrate.

(6) With respect to the structure of the active material powder, diffusion of the electrolyte becomes good by using many micropores and the reaction area increases by increasing the solid-liquid interface. Particularly, it becomes possible to conduct rapid electrode reaction at high rate discharge. When rapid electrode reaction is not conducted, the overvoltage during discharge increases and the discharge voltage is lowered. In the material using the γ phase, since deintercalation/intercalation of alkaline ions occurs as a result of the charge/discharge reaction, it is important to increase the reaction surface of the electrode surface in such way. In order to effectively fill the active material in the electrode, it is essential that the density as the powder is high. It is preferred that a large number of micropores of the active material have a pore diameter of not more than about 200 angstroms and the micropores in the vicinity of the surface layer communicate with each other.

(7) According to the present invention, the characteristics of the active material are extremely improved. For use as the electrode, the conductivity of the active material as the electrode plate must be secured. As described above, the conductivity of the active material itself is secondarily improved by incorporating other elements into $Ni(OH)_2$. However, in the case of constituting the electrode by filling the active material in the two- or three-dimensional metal porous substrate, it is important to compensate the conductivity between the active material powders or the active material and the electrode substrate. Particularly, when the degree of swelling/shrinking is large, like this material, it is effective to provide a fast coat or network on the surface of the active material powder by using a porous conductive layer comprising a lot of crystallites of metal oxides or metals.

Examples of the present invention will be explained in detail hereinafter.

FIG. 1 is a schematic diagram showing an active material powder of the present invention, wherein an average composition in the vicinity of a surface layer 2-1 is different from that of the interior 2-2. The term "in the vicinity of a surface layer" includes not only a surface layer of a particle itself but also a part facing micropores.

The surface layer is composed of a solid solution $Ni(OH)_2$ material with Ca and Y incorporated therein. Ca and Y respectively have an action of increasing an oxygen evolution potential. As a result of this action, oxygen evolution on the surface of the active material is inhibited and the charge efficiency is improved, particularly under a high-temperature (e.g. 45° C., etc.) atmosphere. Therefore, it becomes possible to conduct deep charge of the active material. On the other hand, the interior of the powder is composed of a solid solution $Ni(OH)_2$ material with Mn, Al and Cr incorporated therein. Since Mn and Al respectively have an action of promoting formation of γ-NiOOH, this active material can be charged in a capacity larger than that of a conventional active material. The solid solution γ-NiOOH material including these additive elements is discharged at a voltage within the range which is normally used. Accordingly, the utilization of the active material is improved. Although the discharge voltage is drastically lowered by incorporating Mn, a decrease in voltage and elution of an additive element for forming a solid solution by incorporation (exclusively Cr, Al) are prevented by the surface layer without incorporation of Mn. The embodiment using Ca, Y, Mn, Al and Cr as the additive element for forming a solid solution by incorporation was explained, but the other additive element for forming a solid solution by incorporation can also be applied.

As the shape of the active material, a spherical shape is preferred in view of ease of filling into a metal porous substrate. Therefore, the case where the active material has a spherical shape was exemplified.

Figure 2:
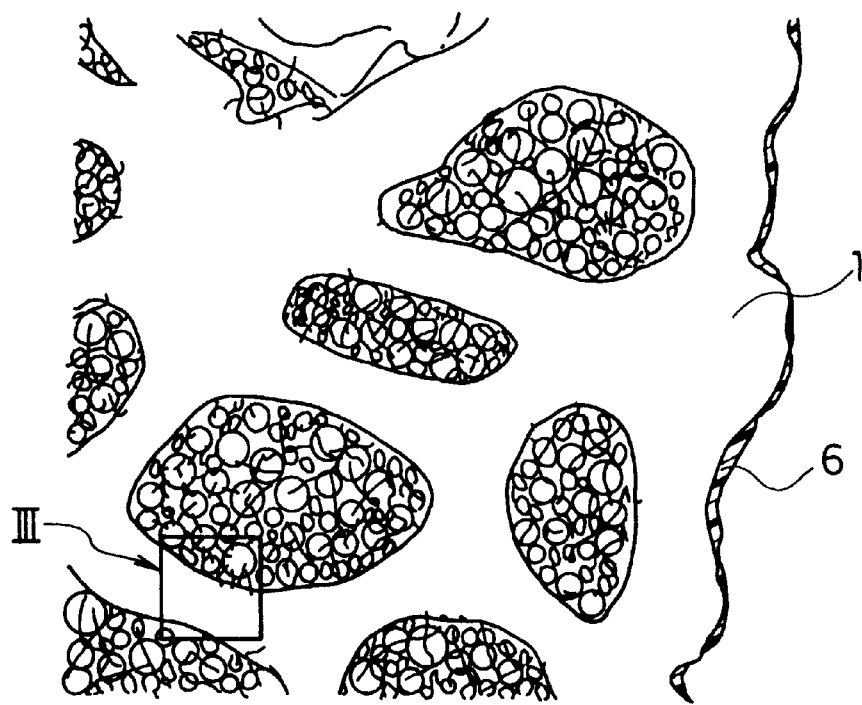
FIG. 2 is a schematic diagram showing a principal part of a positive electrode filled with the active material of the present invention.
Figure 3:
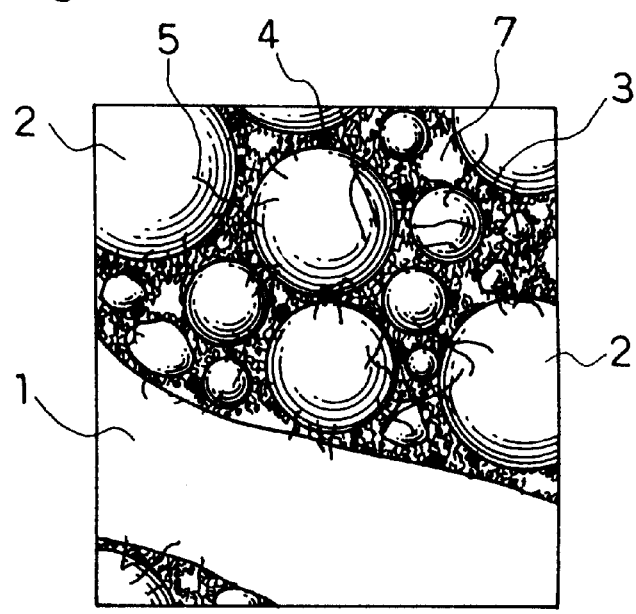
FIG. 3 is a partially enlarged schematic diagram showing the same positive electrode.

FIG. 2 and FIG. 3 respectively show an embodiment wherein a foamed nickel substrate is filled with an active material. In these figures, numeral 1 indicates a skeleton of the foamed nickel substrate. An active material mixture comprising an active material powder 2 coated with a porous conductive layer 3 of CoOOH, a $Y_2O_3$ powder 4 and a tetrafluoroethylene resin 5 as a binder is filled in a three-dimensionally communicating void part. Numeral 6 indicates a fluorocarbon resin film formed by immersing an electrode in an aqueous dispersion of a fluorocarbon resin, and numeral 7 indicates a space part.

In this electrode, active material powder-active material powder and active material-substrate are conductively communicated through CoOOH with which the active material is coated. In addition, the CoOOH and fluorocarbon resin as the binder inhibit an electrode plate from deteriorating by swelling/shrinking. Furthermore, high-temperature charge characteristic is compensated by $Y_2O_3$ added.

A construction of a battery used for evaluating nickel positive electrode plates produced in the following Examples 1 to 13 and Comparative Examples 1 to 10 will be described. The positive electrode plate is formed into 35×35 mm in size and an electrode lead is spot-welded to a lead connection part provided previously in a substrate. Then, the positive electrode plate is covered with a separator of a sulfonated polypropylene nonwoven fabric and the separator is heat-sealed at several positions.

As a counter electrode, a known negative electrode for an alkaline storage battery whose capacity is enough higher than that of the positive electrode is used. A negative electrode of a hydrogen storage alloy $MmNi_{3.5}Co_{0.5}Mn_{0.4}Al_{0.3}$ (Mn: misch metal) was used. The characteristics to be handled are not attributable to the negative electrode used, but to the positive electrode. Accordingly, the same effect can be obtained even when using another negative electrode for an alkaline storage battery, for example, Zr—Mn—V—Co—Ni system hydrogen storage alloy negative electrode, Cd electrode or Zn electrode.

The above hydrogen storage alloy was prepared by mixing Mm, Ni, Co, Mn and Al in a predetermined ratio, followed by melting in an arc melting furnace. The resultant alloy ingot was mechanically ground, thereby to form powders having a particle diameter of 30 μm. To the powders added was an aqueous solution of carboxymethylcellulose as the binder, followed by kneading, thereby to give a paste. The paste was filled in a substrate and pressed, thereby to obtain a hydrogen storage alloy negative electrode plate having a thickness of 0.45 mm and a capacity density of 1350 mAh/cc. This negative electrode plate was cut into a size of 35×35 mm. In the same manner as in the case of the positive electrode, an electrode lead was spot-welded and the negative electrode plate was covered with a separator of a sulfonated polypropylene nonwoven fabric, and then the separator was heat-sealed at several positions. The above positive electrode was interposed between these two negative electrodes and, after inserting them in a battery case, 400 ml of an aqueous 30 wt % KOH solution is poured into the battery case. The characteristics of nickel electrode plates obtained in the following Examples and Comparative Examples are evaluated by the vent type nickel-metal hydride batteries thus produced.

Comparative Example 1

A platinum plate having a thickness of 0.5 mm was cut into a size of 35×35 mm and an electrode lead was spot-welded. A cathode of this platinum plate and a counter electrode of the same platinum plate were immersed in an aqueous $Ni(NO_3)_2$ solution (1 mol/l) in an electrolysis vessel and a current (25 mA) was passed for 3 hours, thereby to electrochemically deposit $Ni(OH)_2$ on the cathode. The platinum plate on which $Ni(OH)_2$ was deposited was subjected to an alkaline treatment by immersing it in an aqueous 30 wt % caustic alkali solution at 60° C. for 40 hours, washed with water and then dried, thereby to obtain a nickel positive electrode plate.

EXAMPLE 1

An aqueous mixed solution (1 liter) containing $Ni(NO_3)_2$ (0.8 mol/l) and $Ca(NO_3)_2$ (0.2 mol/l) was prepared. In this solution, a nickel electrode plate obtained in the same manner as that described in Comparative Example 1 and a counter electrode of a platinum plate were immersed. Then, a current (25 mA) was passed for 1 hour using the nickel electrode plate as the cathode. The above nickel electrode plate was subjected to an alkaline treatment by immersing it in an aqueous 30 wt % KOH solution at 60° C. for 40 hours, washed with water and then dried. Thus, a positive electrode plate comprising a deposited layer of $Ni(OH)_2$ having a thickness of 500 nm, which has a surface layer of a solid solution $Ni(OH)_2$ material with Ca incorporated therein, was obtained. In the same manner as described above except for controlling the quantity of electricity, a positive electrode plate comprising a deposited layer of $Ni(OH)_2$ having a thickness of 50, 100, 200, 500 or 1000 nm, which has a surface layer of a solid solution $Ni(OH)_2$ material with Ca incorporated therein, was obtained.

EXAMPLE 2

A platinum plate having a thickness of 0.5 mm was cut into a size of 35×35 mm and an electrode lead was spot-welded. The resultant plate was immersed in an aqueous $NiSO_4$ solution (1 mol/l) and subjected to cathodic polarization to deposit $Ni(OH)_2$. Then, the plate was subjected to an alkaline treatment by immersing it in an aqueous 30 wt % KOH solution for 24 hours, washed with water and dried.

To an aqueous $NiSO_4$ solution added was ethylenediaminetetraacetic acid (hereinafter referred to as "EDTA"), thereby to form a complex. In the same manner as described above, EDTA was added to an aqueous $Ca(NO_3)_2$ solution, thereby to form a complex. Both solutions were mixed in a desired ratio and deionized water and an aqueous NaOH solution were added to the solution so as to adjust the pH, thereby to prepare a mixed solution (pH 11.5) containing Ni and Ca in the form of a complex ion in an amount of 0.8 mol/l and 0.2 mol/l, respectively. A nickel electrode plate obtained in the same manner as that described in Comparative Example 1 was immersed in the mixed solution (1 liter) thus obtained, followed by heating to 80° C. Then, the above nickel electrode plate was subjected to an alkaline treatment by immersing it in an aqueous 30 wt % KOH solution for 24 hours, washed with water and then dried. Thus, a positive electrode plate comprising a $Ni(OH)_2$ deposited layer having a surface layer of a solid solution $Ni(OH)_2$ material with Ca incorporated therein was obtained.

Figure 4:
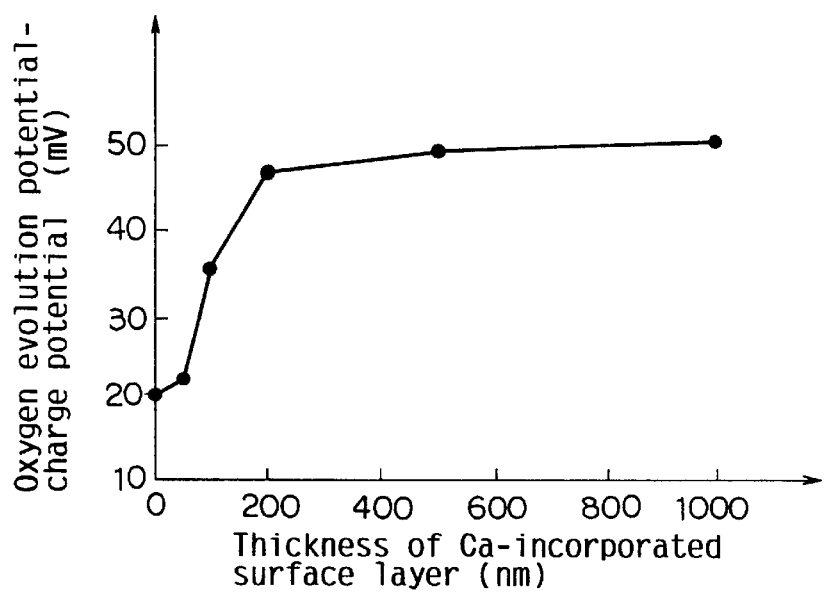
FIG. 4 is a graph showing a relation between the thickness of a surface layer in an electrode using an active material having the surface layer of a solid solution nickel hydroxide material with Ca incorporated therein, and the difference η between an oxygen evolution potential and a charge potential.

FIG. 4 shows a relation between the difference η between an oxygen evolution potential and a charge potential of electrodes of Example 1 and Comparative Example 1, and the thickness of a surface layer containing Ca in a $Ni(OH)_2$ deposited layer. As is apparent from FIG. 4, the electrode plate having the surface layer containing Ca has a value of η larger than that of the electrode of Comparative Example 1 having no surface layer containing Ca. Accordingly, the charge efficiency is improved. On the other hand, when the thickness of the surface layer containing Ca is not less than 500 nm, η becomes approximately constant. Accordingly, the improvement in charge efficiency is sufficient if the electrode plate has the surface layer containing Ca, which has a thickness of about 500 nm.

The electrode plate of Example 1 was coated with a plate-shaped thin film whose surface contains less micropores. The electrode plate of Example 2 had a porous plate wherein a large number of micropores are present. Table 1 shows an average discharge voltage in the case where electrode plates of Example 1, Example 2 and Comparative Example 1 were charged at 2 mA for 10 hours and then discharged at 10 mA.

TABLE 1

|  | Surface layer | Interior | Average discharge voltage (mV) |
|---|---|---|---|
| Comparative example 1 |  | $Ni(OH)_2$ | 1.05 |
| Example 1 | $Ni_{0.9}Ca_{0.1}(OH)_2$ | $Ni(OH)_2$ | 1.08 |
| Example 2 | $Ni_{0.8}Ca_{0.2}(OH)_2$ | $Ni(OH)_2$ | 1.12 |

The electrode of Example 2 had an average discharge voltage higher than that of the electrode of Example 1. Two positive electrodes were prepared in the same manner as in Example 1 and Example 2, respectively, except for electrochemically depositing a solid solution $Ni(OH)_2$ material with Mn incorporated therein in place of $Ni(OH)_2$, and the average discharge voltage was compared between both positive electrodes. As a result, the latter showed higher average discharge voltage than the former. Accordingly, it is preferred that the surface layer of the active material contains a large number of micropores.

EXAMPLE 3

An aqueous mixed solution (1 liter) containing $Ni(NO_3)_2$ (0.9 mol/l) and $Zn(NO_3)_2$ (0.1 mol/l) was prepared, and a $Ni(OH)_2$ positive electrode plate having a thickness of 500 nm, which has a surface layer of a solid solution $Ni(OH)_2$ material with Zn incorporated therein, was obtained in the same manner as that described in Example 1. By changing the concentration of $Ni(NO_3)_2$ and $Zn(NO_3)_2$, a positive electrode plate comprising a deposited layer of $Ni(OH)_2$, which has a surface layer of a solid solution $Ni(OH)_2$ containing a desired amount of Zn, was obtained.

Figure 5:
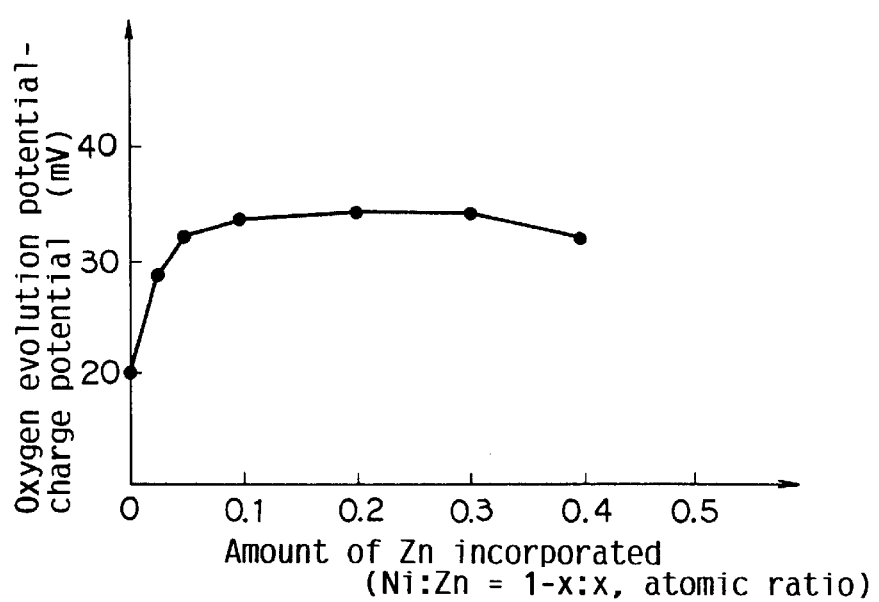
FIG. 5 is a graph showing a relation between the amount of Zn incorporated in a surface layer in an electrode using an active material having the surface layer of a solid solution nickel hydroxide material with Zn incorporated therein, and the difference η between an oxygen evolution potential and a charge potential.

FIG. 5 shows a relation between the difference $\eta$ between an oxygen evolution potential and a charge potential of electrode plates of Example 3 and Comparative Example 1, and the amount of Zn incorporated into the $Ni(OH)_2$ layer containing Zn. The amount x incorporated is a value when the number of nickel atoms is represented by (1−x). As is apparent from FIG. 5, when the amount of Zn incorporated in the surface layer is not less than 0.05, an increase in $\eta$ is clearly recognized. However, when the amount of Zn incorporated is not less than 0.3, formation of ZnO was recognized. Accordingly, the amount of Zn incorporated into the surface layer is preferably from about 0.05 to 0.3.

In the above Examples and Comparative Examples, Ca or Zn was used as the element to be contained in the surface layer of $Ni(OH)_2$. It is possible to use one or more metallic elements selected from the group consisting of Ti, Zn, Sr, Ba, Y, Cd, Co, Cr, Bi and lanthanoids in place of Ca and Zn. In order to form the surface layer of $Ni(OH)_2$ containing these metallic elements, the same method as that described above can be used and the same effect can be obtained.

The difference $\eta$ between the oxygen evolution potential and the charge potential of the electrode produced by using these metallic elements in the same manner as that described in Example 1 is shown in Table 2.

TABLE 2

| Surface layer | Interior | Oxygen evolution potential-charge potential (mV) |
|---|---|---|
| $Ni_{0.9}Ca_{0.1}(OH)_2$ | $Ni(OH)_2$ | 48 |
| $Ni_{0.9}Ti_{0.1}(OH)_2$ | $Ni(OH)_2$ | 60 |
| $Ni_{0.9}Zn_{0.1}(OH)_2$ | $Ni(OH)_2$ | 35 |
| $Ni_{0.9}Sr_{0.1}(OH)_2$ | $Ni(OH)_2$ | 32 |
| $Ni_{0.9}Ba_{0.1}(OH)_2$ | $Ni(OH)_2$ | 33 |
| $Ni_{0.9}Y_{0.1}(OH)_2$ | $Ni(OH)_2$ | 52 |
| $Ni_{0.9}Cd_{0.1}(OH)_2$ | $Ni(OH)_2$ | 32 |
| $Ni_{0.9}Cr_{0.1}(OH)_2$ | $Ni(OH)_2$ | 45 |
| $Ni_{0.9}La_{0.1}(OH)_2$ | $Ni(OH)_2$ | 28 |
| $Ni_{0.9}Nd_{0.1}(OH)_2$ | $Ni(OH)_2$ | 26 |
| $Ni_{0.9}Yb_{0.1}(OH)_2$ | $Ni(OH)_2$ | 47 |
| $Ni_{0.9}Ca_{0.05}Ti_{0.05}(OH)_2$ | $Ni(OH)_2$ | 82 |

EXAMPLE 4

An aqueous $NiSO_4$ solution (1 mol/l), an aqueous NaOH solution (2 mol/l) and aqueous $NH_3$ (2.1 mol/l) were prepared and they were continuously fed to a reaction vessel equipped with a stirring blade at a rate of 1 ml/minute, respectively. The supplied solutions were mixed and stirred in the reaction vessel continuously, thereby to produce nickel hydroxide particles. Then, a suspension containing the particles which was consecutively discharged from the reaction vessel was collected. The resultant nickel hydroxide particles were washed with water by decantation and immersed in an aqueous 30 wt % KOH solution maintained at 40° C. for 5 hours, followed by washing with water and further drying, thereby to obtain a spherical $Ni(OH)_2$ powder having an average particle diameter of 20 $\mu$m.

Then, EDTA was added to an aqueous $NiSO_4$ solution, thereby to form a complex. In the same manner, EDTA was added to an aqueous $Ca(NO_3)_2$ solution, thereby to form a complex. Solutions containing each complex in a predetermined ratio were mixed together and deionized water and an aqueous NaOH solution were added to the solution so as to adjust the pH, thereby to prepare a mixed solution (pH 11.5) containing Ni and Ca in the form of a complex ion in an amount of 0.8 mol/l and 0.2 mol/l, respectively. The $Ni(OH)_2$ powder (50 g) obtained above was mixed with the mixed solution (1 liter), followed by heating to 80° C. with stirring. The resultant suspension was centrifuged and the supernatant was substituted with deionized water and the resultant crystallite was removed by fluid classification, followed by washing with water and further drying. Thus, a spherical powder having an average particle diameter of 20.5 $\mu$m was obtained. Hereinafter, this powder is referred to as "powder A".

To 100 g of this powder A, 10 g of a $Co(OH)_2$ powder as an additive, 0.5 g of a tetrafluoroethylene resin (hereinafter referred to as "PTFE"), 30 g of ethanol and 30 g of water were added, followed by kneading, thereby to form a paste. A foamed nickel substrate having a porosity of 95% was filled with this paste, dried and then pressure-molded, thereby to obtain a nickel positive electrode plate having a thickness of 0.6 mm and a porosity of 25%.

EXAMPLE 5

When preparing the mixed solution of the EDTA complex of nickel and the EDTA complex of calcium in Example 4, a complex prepared by adding EDTA to an aqueous $TiCl_3$ solution was blended in a predetermined ratio. Deionized water and an aqueous NaOH solution were added to this mixed solution so as to adjust the pH, thereby to prepare a mixed solution (pH 11.5) containing Ni, Ca and Ti in the form of a complex ion in an amount of 0.8 mol/l, 0.1 mol/l and 0.1 mol/l, respectively. In the same manner as that described in Example 4 except for using the resulting mixed solution, a spherical powder having an average particle diameter of 21 μm was obtained. Hereinafter, this powder is referred to as "powder B". Using this powder B, a nickel positive electrode plate was obtained in the same manner as that described in Example 4.

EXAMPLE 6

An aqueous mixed solution containing $NiSO_4$ (0.9 mol/l), $CoSO_4$ (0.02 mol/l) and $ZnSO_4$ (0.02 mol/l), an aqueous NaOH solution (2 mol/l) and aqueous $NH_3$ (2.1 mol/l) were prepared and they were continuously fed to a reaction vessel equipped with a stirring blade at a rate of 1 ml/minute, respectively. The supplied solutions were mixed and stirred in the reaction vessel continuously, thereby to produce nickel hydroxide particles. Then, a suspension containing the particles which was consecutively discharged from the reaction vessel was collected. The resultant particles were washed with water by decantation and then dried, thereby to obtain a spherical $Ni(OH)_2$ powder having an average particle diameter of 18 μm, which contains Co and Zn.

Then, EDTA was added to an aqueous mixed solution containing $NiSO_4$, $CoSO_4$ and $ZnSO_4$ in a molar ratio of 92:4:2, thereby to form a complex. In the same manner, EDTA was added to an aqueous $Ca(NO_3)_2$ solution, thereby to form a complex. Solutions containing each complex in a predetermined ratio were mixed together and deionized water and an aqueous NaOH solution were added to the solution so as to adjust the pH, thereby to prepare a mixed solution (pH 11.5) containing Ni, Co, Zn and Ca in the form of a complex ion in an amount of 0.92 mol/l, 0.04 mol/l, 0.02 mol/l and 0.02 mol/l, respectively. The $Ni(OH)_2$ powder (50 g) containing Co and Zn obtained above was mixed with the mixed solution (1 liter), followed by heating to 80° C. with stirring. The resultant suspension was centrifuged and the supernatant was substituted with deionized water and the resultant crystallite was removed by fluid classification, followed by washing with water and further drying. Thus, a spherical powder having an average particle diameter of 18.5 μm was obtained. Hereinafter, this powder is referred to as "powder C".

Using this powder C, a nickel positive electrode plate was obtained in the same manner as that described in Example 4.

EXAMPLE 7

An aqueous mixed solution containing $NiSO_4$ (0.9 mol/l) and $MnSO_4$ (0.1 mol/l), an aqueous NaOH solution (2 mol/l) and aqueous $NH_3$ (2.1 mol/l) were prepared and they were continuously fed to a reaction vessel equipped with a stirring blade at a rate of 1 ml/minute, respectively. The supplied solutions were mixed and stirred in the reaction vessel continuously, thereby to produce nickel hydroxide particles. Then, a suspension containing the particles which was consecutively discharged from the reaction vessel was collected. The resultant particles were washed with water and dried. The resultant powder was immersed in an aqueous 30 wt % KOH solution, heated to 40° C. with stirring, maintained at the same temperature for 20 hours, washed with water and then dried. Thus, a spherical powder having an average particle diameter of 19.5 μm was obtained.

Then, EDTA was added to an aqueous $NiSO_4$ solution, thereby to form a complex. Furthermore, in order to adjust the pH, deionized water and an aqueous NaOH solution were added to the solution, thereby to prepare a mixed solution (pH 11.5) containing Ni in the form of a complex ion in an amount of 1 mol/l. The $Ni(OH)_2$ powder (50 g) obtained above was mixed with this solution (1 liter), followed by heating to 80° C. with stirring. The resultant suspension was centrifuged and the supernatant was substituted with deionized water and the resultant crystallite was removed by fluid classification, followed by washing with water and further drying. Thus, a spherical powder having an average particle diameter of 20 μm was obtained. Hereinafter, this powder is referred to as "powder D".

Using this powder D, a nickel positive electrode plate was obtained in the same manner as that described in Example 4.

EXAMPLE 8

By changing the concentration of the aqueous $NiSO_4$—$MnSO_4$ mixed solution in Example 7, a spherical $Ni(OH)_2$ powder represented by $Ni_{1-x}Mn_x$ (x is 0.05, 0.2 or 0.4) having an average particle diameter of 19.5 μm, which contains Mn, was produced. This powder was treated in the same manner as that described in Example 7, thereby to obtain a spherical powder having an average particle diameter of 20 μm. Using this powder, a nickel positive electrode plate was produced in the same manner as that described in Example 4.

EXAMPLE 9

An aqueous mixed solution containing $NiSO_4$ (0.9 mol/l) and $MnSO_4$ (0.08 mol/l), an aqueous $Cr(NO_3)_3$ solution (0.02 mol/l), an aqueous NaOH solution (2 mol/l) and aqueous $NH_3$ (2.1 mol/l) were prepared. The solutions were successively supplied to a reaction vessel each at a rate of 1 ml/min, and agitated in the reaction vessel continuously. As a result, particles, which are reaction products, became to be produced constantly. Then, a suspension containing the particles which was consecutively discharged from the reaction vessel was collected, and the particles were separated and washed with water, which were then immersed in an aqueous 30 wt % KOH solution at 40° C. for 5 hours, washed and then dried. In this way, a spherical $Ni(OH)_2$ powder having an average particle diameter of 21 μm incorporated with Mn and Cr was obtained. Then, this powder was provided with a surface layer of $Ni(OH)_2$ in the same manner as that described in Example 4, thereby to obtain a spherical powder having an average particle diameter of 21.5 μm. Hereinafter, this powder is referred to as "powder E".

Using this powder E, a nickel positive electrode plate was obtained in the same manner as that described in Example 4.

EXAMPLE 10

An aqueous mixed solution containing $NiSO_4$ (0.9 mol/l), $MnSO_4$ (0.08 mol/l), $Al_2(SO_4)_3$ (0.01 mol/l) and $Cr(NO_3)_3$ (0.01 mol), an aqueous NaOH solution (2 mol/l) and aqueous $NH_3$ (2.1 mol/l) were prepared. The solutions were successively supplied to a reaction vessel each at a rate of 1 ml/min, and agitated in the reaction vessel continuously. As a result, particles, which are reaction products, became to be produced constantly. Then, a suspension containing the particles which was consecutively discharged from the reaction vessel was collected, and the particles were separated and washed with water, which were then immersed in an aqueous 30 wt % KOH solution at 40° C. for 5 hours, washed with water and then dried. Thus, a spherical powder having an average particle diameter of 23 μm was obtained.

On the other hand, a solution containing Ni and Al in the form of a complex ion in an amount of 0.95 mol/l and 0.05 mol/l, respectively, whose pH was adjusted to 11.5 by adding deionized water and an aqueous NaOH solution, was prepared. The powder (50 g) obtained above was mixed with this solution (1 liter), followed by heating to 80° C. with stirring. The resultant suspension was centrifuged and the supernatant was substituted with deionized water and the resultant crystallite was removed by fluid classification, followed by washing with water and further drying. Thus, a spherical powder having an average particle diameter of 10.5 μm was obtained.

This powder (50 g) was mixed with an aqueous 30 wt % KOH solution (1 liter), followed by heating to 60° C. with stirring and further maintained for 20 hours. The resultant solution was centrifuged and the light yellow-colored supernatant was substituted with deionized water, followed by washing with water and further drying, thereby to obtain a powder having an average particle diameter of 24 μm. Hereinafter, this powder is referred to as "powder F".

Using this powder F, a nickel positive electrode plate was obtained in the same manner as that described in Example 4.

EXAMPLE 11

An aqueous mixed solution containing $NiSO_4$ (0.9 mol/l) and $MnSO_4$ (0.1 mol/l), an aqueous NaOH solution (2 mol/l) and aqueous $NH_3$ (2.1 mol/l) were prepared. The solutions were successively supplied to a reaction vessel each at a rate of 1 ml/min, and agitated in the reaction vessel continuously. As a result, particles, which are reaction products, became to be produced constantly. Then, a suspension containing the particles which was consecutively discharged from the reaction vessel was collected, and the particles were separated and washed with water, which were then immersed in an aqueous 30 wt % KOH solution at 40° C. for 5 hours, washed with water and then dried. Thus, a spherical $Ni(OH)_2$ powder having an average particle diameter of 12 μm, which contains Mn, was obtained.

This powder was treated in the same manner as that described in Example 4, and then a surface layer of $Ni(OH)_2$ containing Ca was provided. Hereinafter, this powder is referred to as "powder G". Using this powder G, a nickel positive electrode plate was obtained in the same manner as that described in Example 4.

EXAMPLE 12

An aqueous mixed solution containing $NiSO_4$ (0.9 mol/l), $CoSO_4$ (0.01 mol/l), $MnSO_4$ (0.08 mol/l) and $Al_2(SO_4)_3$ (0.01 mol/l), an aqueous NaOH solution (2 mol/l) and aqueous $NH_3$ (2.1 mol/l) were prepared. The solutions were successively supplied to a reaction vessel each at a rate of 1 ml/min, and agitated in the reaction vessel continuously. As a result, particles, which are reaction products, became to be produced constantly. Then, a suspension containing the particles which was consecutively discharged from the reaction vessel was collected, and the particles were separated and washed with water. Thus, a $Ni(OH)_2$ powder having an average particle diameter of 18 μm, which contains Mn, Co and Al, was obtained. This powder (50 g) was mixed with an aqueous 30 wt % KOH solution (1 liter), heated to 80° C. with stirring and then maintained at the same temperature for 40 hours. Then, the solution was centrifuged and the transparent supernatant was substituted with deionized water, followed by washing with water and further drying, thereby to obtain a powder having an average particle diameter of 8 μm.

On the other hand, EDTA was added to an aqueous mixed solution containing $NiSO_4$, $CoSO_4$ and $Al_2(SO_4)_3$ and an aqueous $Ca(NO_3)_2$ solution, thereby to form a complex, respectively. Both solutions were mixed in a predetermined ratio, and then deionized water and an aqueous NaOH were added so as to adjust the pH, thereby to prepare a mixed solution (pH 11.5) containing Ni, Co, Al and Ca in the form of a complex ion in an amount of 0.9 mol/l, 0.02 mol/l, 0.02 mol/l and 0.06 mol/l, respectively.

The $Ni(OH)_2$ powder (50 g) obtained above was mixed with this solution (1 liter), followed by heating to 80° C. with stirring. The resultant suspension was centrifuged and the supernatant was substituted with deionized water and the resultant crystallite was removed by fluid classification, followed by washing with water and further drying. Thus, a spherical powder having an average particle diameter of 18.5 μm was obtained. Hereinafter, this powder is referred to as "powder H".

Using this powder H, a nickel positive electrode plate was obtained in the same manner as that described in Example 4.

Comparative Example 2

An aqueous $NiSO_4$ solution (1 mol/l), an aqueous NaOH solution (2 mol/l) and aqueous $NH_3$ (2.1 mol/l) were prepared and they were continuously fed to a reaction vessel at a rate of 1 ml/minute, respectively. After the mixed solution was stirred in the reaction vessel, particles in the resultant suspension were screened in a fluid, washed with water and then dried. As a result, a spherical $Ni(OH)_2$ powder having an average particle diameter of 21 μm was obtained. Using this powder, a nickel positive electrode plate was obtained in the same manner as that described in Example 4.

Comparative Example 3

An aqueous mixed $NiSO_4$ solution containing $NiSO_4$ (0.96 mol/l), $CoSO_4$ (0.02 mol/l) and $ZnSO_4$ (0.02 mol/l), an aqueous NaOH solution (2 mol/l) and deionized water were prepared and they were continuously fed to a reaction vessel at a rate of 1 ml/minute, respectively. After the mixed solution was stirred in the reaction vessel, the resultant suspension was collected, washed with water and then dried. As a result, a spherical $Ni(OH)_2$ powder having an average particle diameter of 21 μm was obtained. Using this powder, a nickel positive electrode plate was obtained in the same manner as that described in Example 4.

Comparative Example 4

To 99 g of the spherical powder $Ni(OH)_2$ obtained in Comparative Example 1, 10 g of a $Co(OH)_2$ powder and 1 g of a $Ca(OH)_2$ powder as additives, 30 g of water and 30 g of ethanol were added, followed by kneading to form a paste. Using this paste, a nickel positive electrode plate was obtained in the same manner as that described in Example 4.

Comparative Example 5

An aqueous $NiSO_4$ solution (0.9 mol/l), an aqueous $Ca(NO_3)_2$ solution (0.1 mol/l), an aqueous NaOH solution (2 mol/l) and aqueous $NH_3$ (2.1 mol/l) were prepared and they were continuously fed to a reaction vessel at a rate of 1 ml/minute, respectively. After the mixed solution was stirred in the reaction vessel, the resultant suspension was collected, washed with water and then dried. As a result, a solid solution $Ni(OH)_2$ powder with Ca incorporated therein, which has an average particle diameter of 12 μm, was obtained. Using this powder, a nickel positive electrode plate was obtained in the same manner as that described in Example 4.

Comparative Example 6

An aqueous $NiSO_4$ solution (0.9 mol/l), an aqueous $MnSO_4$ solution (0.1 mol/l), an aqueous NaOH solution (2 mol/l) and aqueous $NH_3$ (2.1 mol/l) were prepared and they were continuously fed to a reaction vessel at a rate of 1 ml/minute, respectively. After the mixed solution was stirred in the reaction vessel, the resultant suspension was collected and the precipitate was separated by decantation. The resultant precipitate was washed with water and then dried. As a result, a solid solution Ni(OH)$_2$ powder with Ca incorporated therein, which has an average particle diameter of 12 μm, was obtained. Using this powder, a nickel positive electrode plate was obtained in the same manner as that described in Example 4.

Comparative Example 7

To an aqueous MnSO$_4$ solution (1 mol/l), an aqueous H$_3$PO$_4$ solution was added, thereby to adjust the pH to 2. After the aqueous H$_2$O$_2$ solution was added to this solution, the aqueous H$_3$PO$_4$ solution was further added to adjust the concentration of Mn to 0.1 mol/l.

Then, an aqueous NiSO$_4$ solution (0.9 mol/l), an aqueous NaOH solution (1.8 mol/l) and aqueous NH$_3$ (2 mol/l) were prepared and they were continuously fed to a reaction vessel at a rate of 1 ml/minute, respectively. After the mixed solution was stirred in the reaction vessel, the resultant suspension was collected. This suspension was washed with water and then dried, thereby to obtain a Ni(OH)$_2$ powder having an average particle diameter of 20 μm, which contains Mn.

Then, EDTA was added to an aqueous NiSO$_4$ solution, thereby to form a complex. In the same manner, EDTA was added to an aqueous Ca(NO$_3$)$_2$ solution, thereby to form a complex. Both solutions were mixed in a predetermined ratio, and then deionized water and an aqueous NaOH were added so as to adjust the pH, thereby to prepare a mixed solution (pH 9.5) containing Ni and Ca in the form of a complex ion in an amount of 0.8 mol/l and 0.2 mol/l, respectively. The Ni(OH)$_2$ powder (50 g) obtained above was mixed with this solution (1 liter), followed by heating to 80° C. with stirring. The resultant suspension was centrifuged and the supernatant was substituted with deionized water, then the resultant crystallite was removed by fluid classification, followed by washing with water and further drying. Thus, a spherical powder having an average particle diameter of 20.5 μm was obtained. Using this powder, a nickel positive electrode plate was obtained in the same manner as that described in Example 4.

Comparative Example 8

An aqueous NiSO$_4$ solution (0.9 mol/l), an aqueous MnSO$_4$ solution (0.1 mol/l) and an aqueous NaOH solution (2 mol/l) were prepared and they were continuously fed to a reaction vessel at a rate of 1 ml/minute, respectively. After the mixed solution was stirred in the reaction vessel, the resultant suspension was collected. The resultant powder was washed with water, dried, ground and then sifted, thereby to obtain Ni(OH)$_2$ powders having a particle diameter of not less than 200 μm and not more than 30 μm, which contain Mn. These powders (50 g) were mixed with an aqueous 30 wt % KOH solution (1 liter), followed by heating to 80° C. with stirring and further maintained for 40 hours. The resultant was centrifuged and the transparent supernatant was substituted with deionized water, followed by washing with water and further drying. These powders were treated with an EDTA complex solution in the same manner as that described in Example 4, thereby to obtain powders. Using these powders, nickel positive electrode plates were respectively produced in the same manner as that described in Example 4.

Figure 6:
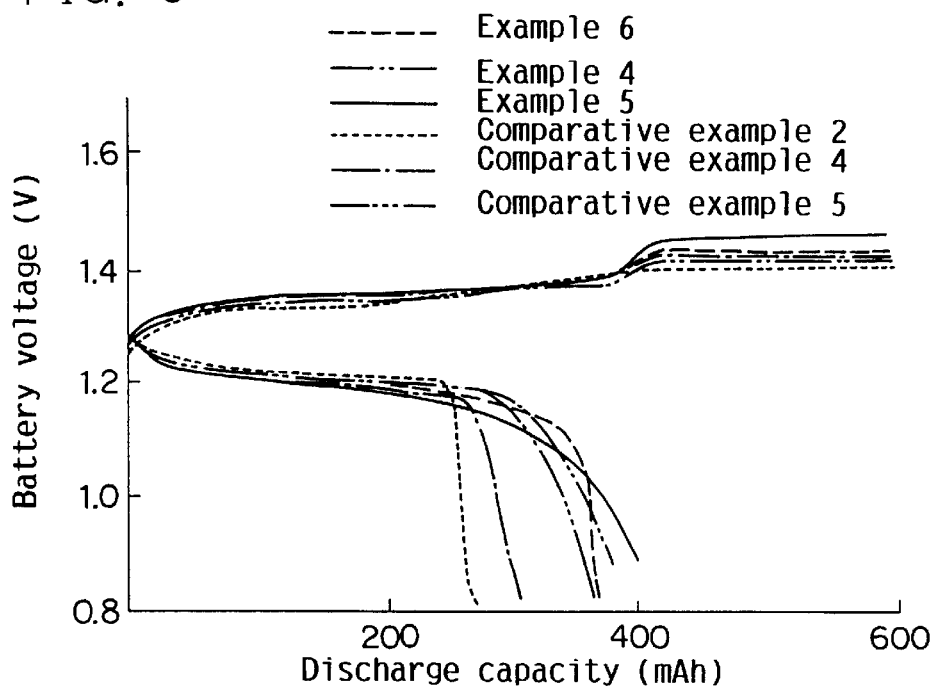
FIG. 6 is a graph showing charge/discharge curves of batteries using the electrodes of Examples 4 and 5 and Comparative Example 2.

FIG. 6 shows charge/discharge curves when batteries using the electrodes of Examples 4, 5 and 6 and Comparative Examples 2, 4 and 5 are charged at 45° C. at a current of 40 mA for 15 hours and then discharged until the battery voltage is lowered to 1.0 V at 20° C. at a current of 80 mA.

As shown in the charge curves of FIG. 6, the electrodes of Examples 4 and 5 have an oxygen evolution potential higher than that of the electrode of Comparative Example 2, and charging is sufficiently conducted. On the other hand, in Comparative Example 5 using a Ni(OH)$_2$ powder containing Ca and Comparative Example 4 wherein Ca(OH)$_2$ was added as an additive at the time of constitution of the electrode, the difference η between the oxygen evolution potential and the charge potential is not as large as that of Examples 4 and 5. It is recognized that they are inferior in capacity despite a large amount of Ca. This reason is considered as follows, that is, an increase in charge amount by an increase in oxygen evolution potential is insufficient and the capacity density is decreased by incorporation of Ca. Example 6 uses an active material particle wherein a widely used solid solution Ni(OH)$_2$ material with Co and Zn incorporated therein is provided with a surface layer of a solid solution Ni(OH)$_2$ material with Co, Cd and Ca incorporated therein. By using a plurality of additive elements in combination in such way, the charge efficiency is sufficiently improved even if the amounts of the elements incorporated into the surface layer are small. Incidentally, by using a solid solution Ni(OH)$_2$ material with Co and Zn incorporated into the interior, the cycle characteristic was also improved.

Figure 7:
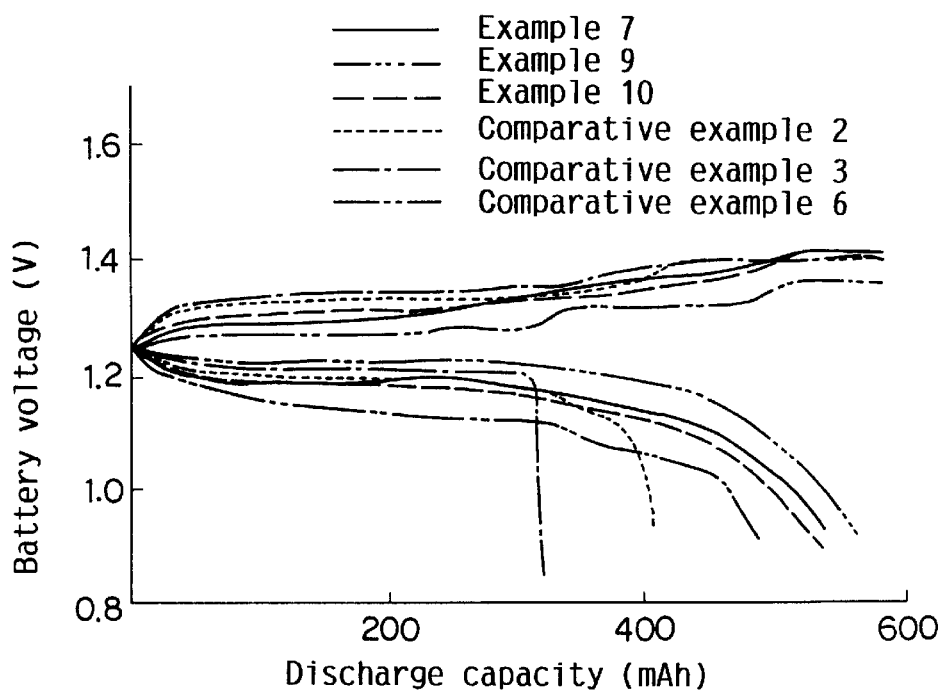
FIG. 7 is a graph showing charge/discharge curves of batteries using the electrodes of Examples 7, 9 and 10 and Comparative Examples 2, 3 and 6.

FIG. 7 shows charge/discharge curves when batteries using the electrodes of Examples 7, 9 and 10 and Comparative Examples 2, 3 and 6 are charged at 20° C. at a current of 40 mA for 15 hours and then discharged until the battery voltage is lowered to 1.0 V at 20° C. at a current of 80 mA.

As shown in the charge curves of FIG. 7, with respect to the electrodes of Examples 7, 9 and 10, the discharge capacity density is drastically increased in comparison with the case where the electrode of Comparative Example 2 or the improved electrode of Comparative Example 3 using the solid solution nickel hydroxide powder with Co and Zn incorporated therein is used. In addition, a remarkable difference in capacity density between Examples 7, 9 and 10 and Comparative Example 6 wherein a large amount of the same γ phase is formed is not recognized. With respect to Examples 7 and 9 having the surface layer incorporated with no Mn, the average discharge voltage is about 50 mV higher than that of Comparative Example 3. It is found that, with respect to those incorporated with Al like Example 10, the discharge voltage is unusually high. As described hereinabove, such an improvement in voltage is extremely important in view of high rate discharge and improvement in energy density of the battery represented by Wh/l or Wh/kg.

Figure 8:
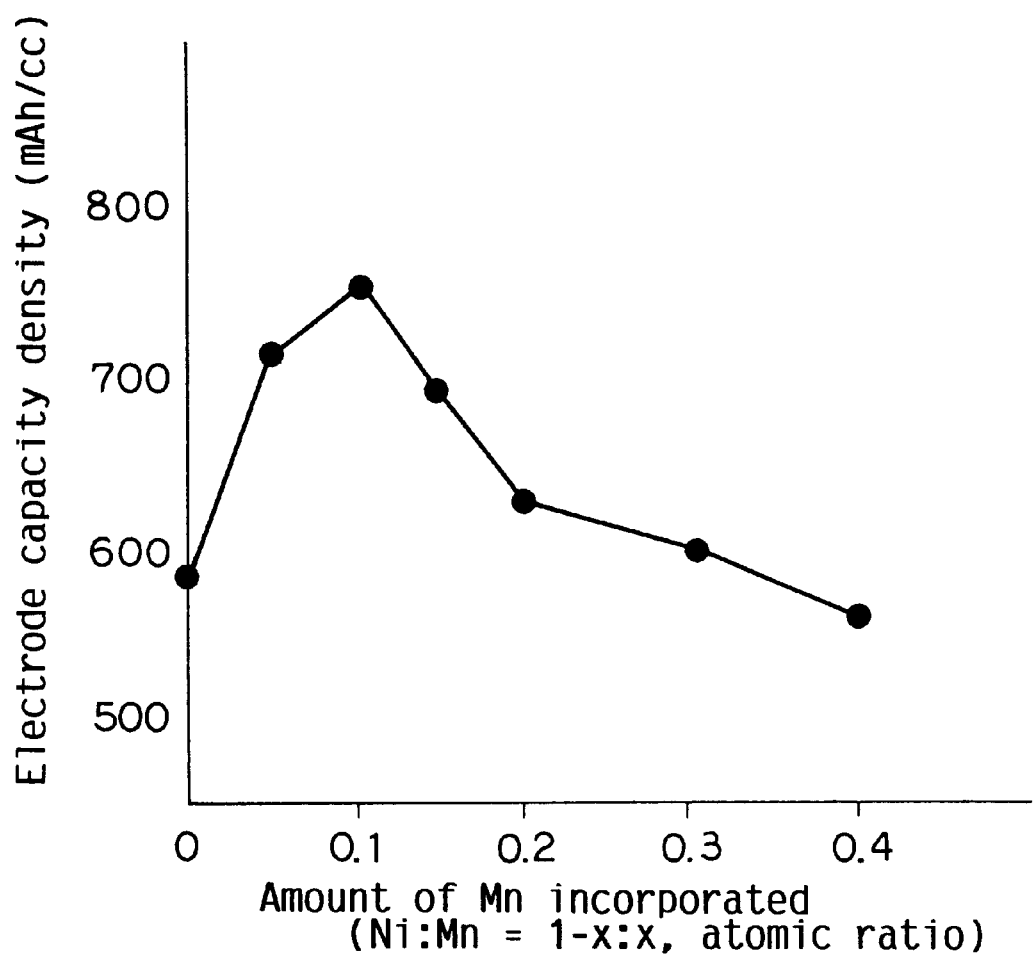
FIG. 8 is a graph showing a relation between the amount of Mn incorporated and the electrode capacity density in an electrode using an active material of a solid solution nickel hydroxide material with Mn incorporated in the interior.

FIG. 8 shows plots of electrode capacity density versus amount of Mn incorporated when batteries using the electrodes of Examples 7 and 8 and Comparative Example 2 are charged at 20° C. at a current of 40 mA for 15 hours and then discharged until the battery voltage is lowered to 1.0 V at 20° C. at a current of 80 mA. As is apparent from FIG. 8, when the amount of Mn incorporated is not less than 0.35, a decrease in capacity density as a result of a decrease in content of Ni is drastically large in comparison with the effect on improvement in utilization of Ni by incorporation of Mn. Therefore, it is found that the electrode capacity density is rather lowered in comparison with Comparative Example 2 (corresponding to x=0).

Table 3 shows a discharge capacity and an average voltage when an electrode having a surface layer Ni(OH)$_2$ containing various metallic elements, produced the same method as that shown in Example 8 and Comparative Example 5, is charged at 20° C. at a current of 40 mA for 15 hours and then discharged until the battery voltage is lowered to 1.0 V at 20° C. at a current of 80 mA.

TABLE 3

| Surface layer | Interior | Discharge capacity (mAh) | Average voltage (V) |
|---|---|---|---|
| Ni(OH)$_2$ | Ni$_{0.9}$Al$_{0.1}$(OH)$_2$ | 525 | 1.23 |
| Ni(OH)$_2$ | Ni$_{0.9}$V$_{0.1}$(OH)$_2$ | 430 | 1.21 |
| Ni(OH)$_2$ | Ni$_{0.9}$Cr$_{0.1}$(OH)$_2$ | 445 | 1.16 |
| Ni(OH)$_2$ | Ni$_{0.9}$Mn$_{0.1}$(OH)$_2$ | 498 | 1.18 |
| Ni(OH)$_2$ | Ni$_{0.9}$Fe$_{0.1}$(OH)$_2$ | 487 | 1.15 |

TABLE 3-continued

| Surface layer | Interior | Discharge capacity (mAh) | Average voltage (V) |
|---|---|---|---|
| Ni(OH)$_2$ | Ni$_{0.9}$Cu$_{0.1}$(OH)$_2$ | 473 | 1.14 |
| Ni(OH)$_2$ | Ni$_{0.9}$Ge$_{0.1}$(OH)$_2$ | 458 | 1.17 |
| Ni(OH)$_2$ | Ni$_{0.9}$Zr$_{0.1}$(OH)$_2$ | 476 | 1.18 |
| Ni(OH)$_2$ | Ni$_{0.9}$Nb$_{0.1}$(OH)$_2$ | 480 | 1.14 |
| Ni(OH)$_2$ | Ni$_{0.9}$Mo$_{0.1}$(OH)$_2$ | 495 | 1.18 |
| Ni(OH)$_2$ | Ni$_{0.9}$Ag$_{0.1}$(OH)$_2$ | 503 | 1.12 |
| Ni(OH)$_2$ | Ni$_{0.9}$Sn$_{0.1}$(OH)$_2$ | 497 | 1.18 |
| Ni(OH)$_2$ | Ni$_{0.9}$Sb$_{0.1}$(OH)$_2$ | 468 | 1.08 |
| Ni(OH)$_2$ | Ni$_{0.9}$W$_{0.1}$(OH)$_2$ | 475 | 1.12 |
| Ni(OH)$_2$ | Ni$_{0.9}$Mn$_{0.05}$Al$_{0.05}$(OH)$_2$ | 548 | 1.22 |

Figure 9:
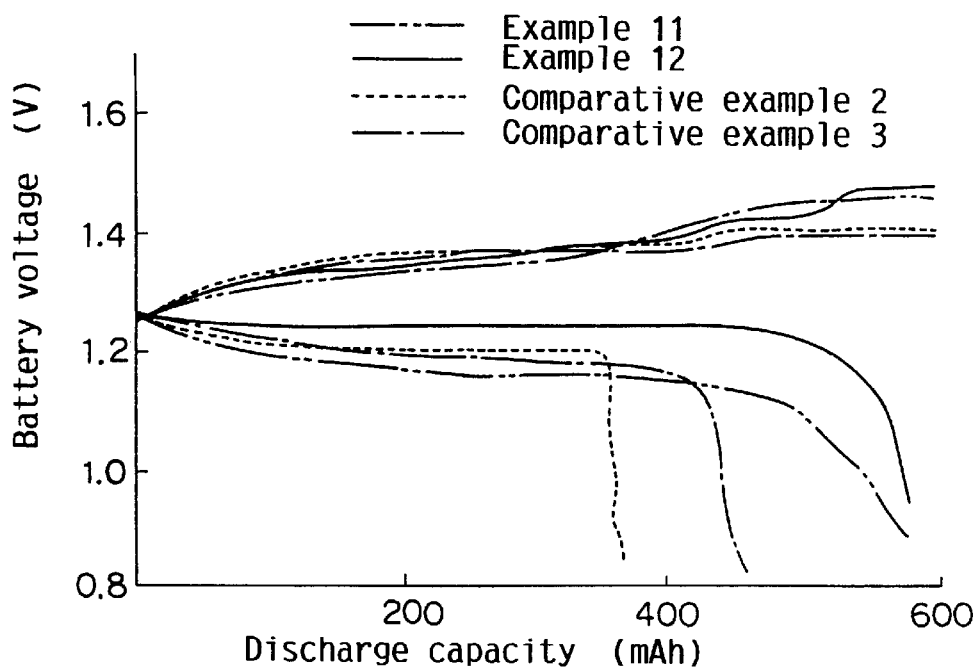
FIG. 9 is a graph showing charge/discharge curves of batteries using the electrodes of Examples 11 and 12 and Comparative Examples 2 and 3.

FIG. 9 shows charge/discharge curves when batteries using the electrodes of Examples 11 and 12 and Comparative Examples 2 and 3 are charged at 20° C. at a current of 40 mA for 15 hours and then discharged until the battery voltage is lowered to 1.0 V at 20° C. at a current of 80 mA.

As is apparent from FIG. 9, with respect to the electrodes of the present invention, remarkable effects of improving the electrode capacity density and increasing the difference η between the oxygen evolution potential and the charge potential are recognized and, furthermore, a decrease in discharge voltage is not recognized. It is found that the electrode whose surface layer contains Al of Example 12 exhibits a charge voltage higher than that of the electrodes of Comparative Examples 2 and 3.

Table 4 shows a discharge capacity, a difference η between an oxygen evolution voltage and a charge potential, and an average voltage when an electrode having a surface layer of Ni(OH)$_2$ containing various metallic elements in the interior and the surface layer, produced by the same method as that shown in Examples 11 and 12, is charged at 20° C. at a current of 40 mA for 15 hours and then discharged until the battery voltage is lowered to 1.0 V at 20° C. at a current of 80 mA.

TABLE 4

| | | Charged at 20° C. | | | Charged at 45° C. | |
|---|---|---|---|---|---|---|
| Surface layer | Interior | Discharge capacity (mAh) | Oxygen evolution potential -charge potential (mV) | Average voltege (V) | Discharge capacity (mAh) | Oxygen evolution potential -charge potential (mV) |
| Ni$_{0.9}$Ca$_{0.1}$(OH)$_2$ | Ni$_{0.9}$Al$_{0.1}$(OH)$_2$ | 523 | 48 | 1.22 | 453 | 23 |
| Ni$_{0.9}$Ti$_{0.1}$(OH)$_2$ | Ni$_{0.9}$V$_{0.1}$(OH)$_2$ | 433 | 58 | 1.22 | 387 | 28 |
| Ni$_{0.9}$Zn$_{0.1}$(OH)$_2$ | Ni$_{0.9}$Cr$_{0.1}$(OH)$_2$ | 440 | 35 | 1.16 | 329 | 15 |
| Ni$_{0.9}$Sr$_{0.1}$(OH)$_2$ | Ni$_{0.9}$Mn$_{0.1}$(OH)$_2$ | 499 | 32 | 1.18 | 421 | 18 |
| Ni$_{0.9}$Ba$_{0.1}$(OH)$_2$ | Ni$_{0.9}$Fe$_{0.1}$(OH)$_2$ | 492 | 31 | 1.15 | 384 | 17 |
| Ni$_{0.9}$Y$_{0.1}$(OH)$_2$ | Ni$_{0.9}$Cu$_{0.1}$(OH)$_2$ | 474 | 49 | 1.14 | 402 | 21 |
| Ni$_{0.9}$Cd$_{0.1}$(OH)$_2$ | Ni$_{0.9}$Ge$_{0.1}$(OH)$_2$ | 465 | 33 | 1.20 | 375 | 16 |
| Ni$_{0.9}$Cr$_{0.1}$(OH)$_2$ | Ni$_{0.9}$Zn$_{0.1}$(OH)$_2$ | 472 | 40 | 1.16 | 380 | 15 |
| Ni$_{0.9}$La$_{0.1}$(OH)$_2$ | Ni$_{0.9}$Al$_{0.1}$(OH)$_2$ | 488 | 21 | 1.21 | 365 | 8 |
| Ni$_{0.9}$Nd$_{0.1}$(OH)$_2$ | Ni$_{0.9}$V$_{0.1}$(OH)$_2$ | 486 | 20 | 1.18 | 360 | 8 |
| Ni$_{0.9}$Yb$_{0.1}$(OH)$_2$ | Ni$_{0.9}$Cr$_{0.1}$(OH)$_2$ | 511 | 49 | 1.12 | 418 | 20 |
| Ni$_{0.9}$Ca$_{0.05}$—Ti$_{0.05}$(OH)$_2$ | Ni$_{0.9}$Mn$_{0.1}$(OH)$_2$ | 530 | 78 | 1.19 | 437 | 24 |
| Ni$_{0.9}$Ca$_{0.1}$(OH)$_2$ | Ni$_{0.9}$Fe$_{0.1}$(OH)$_2$ | 468 | 38 | 1.12 | 408 | 19 |
| Ni$_{0.9}$Ti$_{0.1}$(OH)$_2$ | Ni$_{0.9}$Mn$_{0.1}$(OH)$_2$ | 472 | 49 | 1.14 | 427 | 24 |
| Ni$_{0.9}$Zn$_{0.1}$(OH)$_2$ | Ni$_{0.9}$Mn$_{0.05}$—Al$_{0.05}$(OH)$_2$ | 538 | 32 | 1.22 | 443 | 16 |

Table 5 shows a tap density of powders of Example 11 and Comparative Examples 7 and 8, a filling density into the electrodes, and an electrode capacity density of the electrodes. With respect to Comparative Example 7, the electrode capacity density is very low despite the same electrode porosity. This is because the density of the powder is lowered by containing the α-phase having a wide interlayer distance and the content of Ni is drastically decreased. In Comparative Example 7, when using powders having a particle diameter of not less than 200 μm and not more than 30 μm, it was impossible to produce a predetermined electrode having a porosity of 25%. This fact indicates that the electrode capacity density is lower than that of Example 11. It is apparent from the fact that the pore diameter of the porous metal substrate is from about 100 to 200 nm, the powder having a particle diameter of about 200 μm can not be easily filled. Even if the particle diameter is the same as that of the porous metal substrate, filling is largely affected by a shape factor. Therefore, a spherical shape is suitable for filling. In order to produce an electrode of high capacity density which exceeds the currently available capacity density, it is important to intensively improve the filling property into the electrode.

TABLE 5

|  | Tap density (g/cc) | Electrode filling amount (g/cc) | Electrode capacity density (mAh/cc) |
|---|---|---|---|
| Example 11 | 2.1 | 1.23 | 780 |
| Comparative example 7 | 0.8 | 0.45 | 580 |
| Comparative example 8 (less than 30 μm) | 1.6 | 0.82 | 650 |

EXAMPLE 13

In the same manner as that described in Example 12 except for adding $Y_2O_3$ in an amount of 0.5% by weight of the active material, a nickel positive electrode plate was obtained.

Comparative Example 9

In the same manner as that described in Example 12 except for adding no $Co(OH)_2$, a nickel positive electrode plate was obtained.

Figure 10:
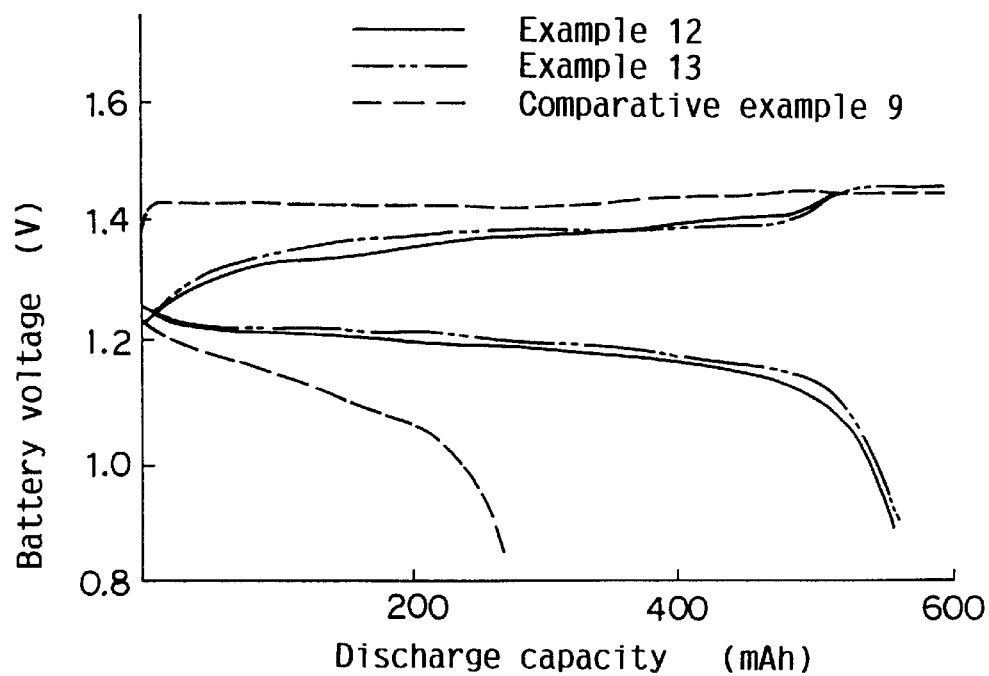
FIG. 10 is a graph showing charge/discharge curves of batteries using the electrodes of Examples 12 and 13 and Comparative Example 9.

FIG. 10 shows charge/discharge curves when batteries using the electrodes of Examples 12 and 13 and Comparative Example 9 are charged at 20° C. at a current of 40 mA for 15 hours and then discharged until the battery voltage is lowered to 1.0 V at 20° C. at a current of 80 mA.

As is apparent from FIG. 10, Comparative Example 9 wherein no $Co(OH)_2$ is added, that is, the active material and substrate are not coated with CoOOH porous layer having the conductivity even after initial charging, is drastically inferior in discharge characteristic to Example 12. Therefore, it is not preferred to use it as the electrode. It is recognized that, with respect to Example 13 wherein a small amount of $Y_2O_3$ is added, the difference η between the oxygen evolution potential and the charge potential is slightly increased in comparison with Example 12.

Comparative Example 10

In the same manner as that described in Example 12 except for adding no PTFE, a nickel positive electrode plate was obtained.

Figure 11:
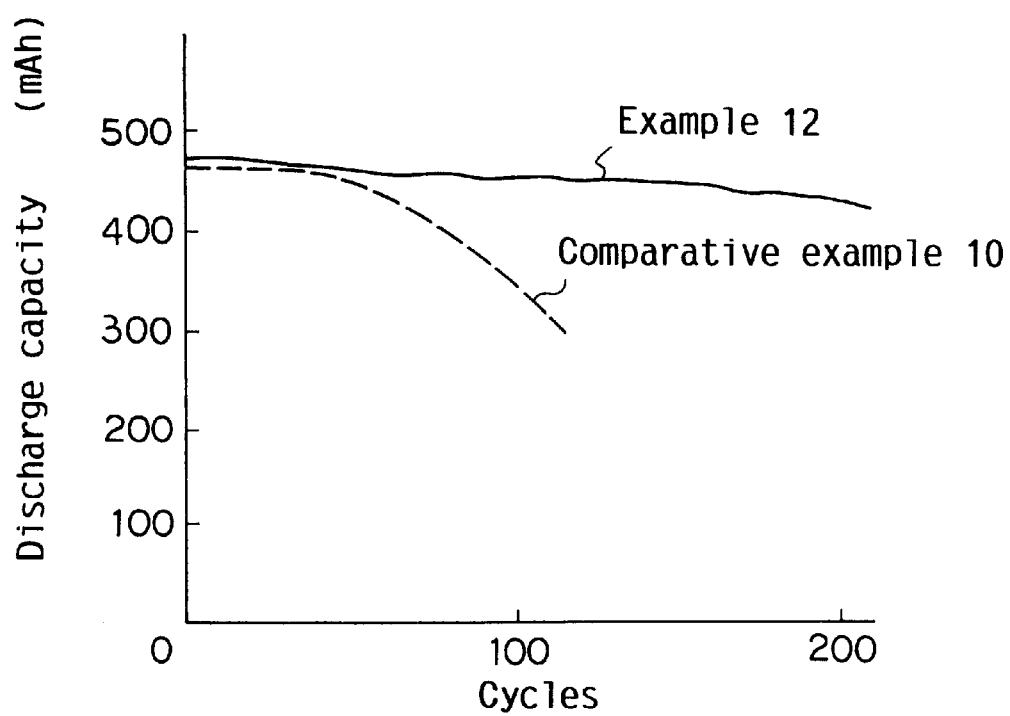
FIG. 11 is a graph illustrating a change in cycle of a discharge capacity of the electrodes of Example 12 and Comparative Example 10.

FIG. 11 shows plots of discharge capacity versus charge/discharge cycle when batteries using the electrodes of Example 12 and Comparative Example 10 are charged at 20° C. at a current of 40 mA for 15 hours and then discharged until the battery voltage is lowered to 1.0 V at 20° C. at a current of 80 mA.

As is apparent from FIG. 11, with respect to Example 12, the cycle characteristic is improved in comparison with Comparative Example 10 containing no PTFE. This reason is considered as follows. That is, falling off of the active material powder due to swelling and shrinking is inhibited by the binding action of PTFE. Incidentally, it is also effective for improving the dispersion property of a conductive fine powder such as $Co(OH)_2$ to form a paste by adding a binder.

EXAMPLE 14

A positive electrode plate obtained in the same manner as that described in Example 13 was cut into a size of 39×86 mm and an electrode lead was spot-welded to a lead connection part provided previously in a substrate, thereby to form a nickel positive electrode. On the other hand, an electrode having a capacity of 2150 mAh produced by cutting a hydrogen storage alloy negative electrode plate having a thickness of 0.45 mm and a capacity density of 1350 mAh/cc obtained in the same manner as that described previously in the above Examples into pieces of 39×91 mm in size was used as a negative plate.

These positive electrode plate and negative electrode plate were combined while interposing a separator of a sulfonated polypropylene nonwoven fabric having a thickness of 0.15 mm therebetween, thereby to constitute a spiral electrode group. This electrode group was inserted into a battery case and, after pouring 2.2 ml of an electrolyte of an aqueous 30 wt % KOH solution into the battery case, an opening part of the battery case was closed by using a sealing member equipped with a safety valve having an operating valve pressure of 20 kgf/cm². Thus, a cylindrical sealed nickel-metal hydride storage battery (AA size) was produced.

Comparative Example 11

In the same manner as that described in Example 14 except for using the positive electrode plate produced in the same manner as that described in Comparative Example 3 after cutting it into a size of 39×86 mm, a cylindrical sealed nickel-metal hydride storage battery (AA size) was produced.

Table 6 shows an energy density and the difference η between an oxygen evolution voltage and a charge potential when the batteries of Example 14 and Comparative Example 11 are charged at 20° C. or 45° C. at a current of 40 mA for 15 hours and then discharged until the battery voltage is lowered to 1.0 V at 20° C. at a current of 80 mA.

TABLE 6

|  |  |  | Charged at 20° C. | | Charged at 45° C. | |
|---|---|---|---|---|---|---|
|  | Surface layer | Interior | Energy density (Wh/l) | Oxygen evolution potential -charge potential (mV) | Energy density (Wh/l) | Oxygen evolution potential -charge potential (mV) |
| Example 14 | $Ni_{0.9}Ca_{0.06}$—$Co_{0.02}Al_{0.02}$ | $Ni_{0.9}Mn_{0.06}$—$Al_{0.01}Co_{0.01}$ | 230 | 48 | 217 | 22 |
| Comparative example 11 |  | $Ni_{0.96}Co_{0.09}Zn_{0.02}$ | 201 | 21 | 128 | 5 |

As is apparent from Table 6, with respect to the battery of Example 14, a remarkable improvement in energy density is recognized in comparison with the battery of Comparative Example 11. The difference between the oxygen evolution potential and the charge potential is large. The battery of Example 14 has a remarkable effect of increasing the oxygen evolution voltage during charge, and a large effect is recognized on the capacity during charge at high temperature.

As explained above, according to the present invention, the oxygen evolution overvoltage of the surface of the positive electrode active material can be increased and, therefore, the charge acceptance at high temperature can be improved. Since such an action is effected only in the vicinity of the surface, the resultant electrode is superior in capacity density to the conventional electrode. It is possible to accomplish a drastic improvement in electrode capacity density by modifying the interior of the active material into an active material whose utilization is higher than that of the conventional active material. According to the present invention, it is possible to provide a positive electrode for an alkaline storage battery, which is superior in capacity density in a wide temperature range.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A positive electrode active material for an alkaline storage battery, said active material comprising particles of a nickel based multi-metals oxide, said nickel based multi-metals oxide particles having an interior and a surface layer, said nickel based multi-metals oxide particles being porous in at least the surface layer, wherein an average composition of the surface layer is different from that of the interior in that at least one element selected from the group consisting of Ca, Ti, Zn, Sr, Y, Cr, Bi and lanthanoids, in addition to Ni, is contained in the surface layer at a concentration higher than that of the interior, and wherein said active material is based on nickel hydroxide and is capable of reversibly cycling between beta- and gamma-nickel hydroxide crystalline phases during electrochemical charge and discharge.

2. The positive electrode active material for an alkaline storage battery in accordance with claim 1, wherein an average amount x of the whole metallic elements except for Ni contained in the surface layer of said nickel based multi-metals oxide is within the range represented by the following formula:

$$0.01 \leq x \leq 0.4$$

when the number of atoms of the total metallic elements containing Ni is 1.

3. The positive electrode active material for an alkaline storage battery in accordance with claim 1, wherein said nickel based multi-metals oxide is at least one of a solid solution nickel hydroxide material with a metallic element other than Ni incorporated therein and an eutectic mixture of oxides of Ni and the respective metallic element other than Ni.

4. The positive electrode active material for an alkaline storage battery in accordance with claim 1, wherein the porous surface layer of said nickel based multi-metals oxide is characterized by micropores having pore diameters of not more than 200 angstroms and being in communication with each other and wherein the surface layer has a thickness of from 10 to 500 nanometers.

5. The positive electrode active material for an alkaline storage battery in accordance with claim 1, wherein said nickel based multi-metals oxide is a powder having an average diameter of not more than 100 μm, said powder having a spherical shape or a shape like a sphere and having a tap density of not less than 1.5 g/cc.

6. The positive electrode active material for an alkaline storage battery in accordance with claim 1, wherein said active material is a powder prepared by a precipitation method.

7. A positive electrode for an alkaline storage battery comprising a conductive supporting member and an active material mixture supported on said conductive supporting member, said active material mixture containing the active material of claim 6.

8. The positive electrode for an alkaline storage battery in accordance with claim 7, wherein said active material powder is coated with a conductive porous layer of a metal oxide or a metal.

9. The positive electrode for an alkaline storage battery in accordance with claim 7, wherein said active material mixture contains at least one powder selected from the group consisting of Ni, graphite, a Ca compound, a Ti compound, an Sr compound, a Ba compound, a Y compound, a Cd compound, Co, a Co compound, a Zn compound and a rare earth metal compound in an amount of 0.5 to 20.0% by weight of said active material powder.

10. The positive electrode active material for an alkaline storage battery in accordance with claim 1, wherein said active material is one deposited electrochemically in or on a porous conductive substrate.

11. The positive electrode active material according to claim 1, wherein the surface layer gas pores having maximum diameters of not more than 200 angstroms.

12. The positive electrode active material for an alkaline storage battery in accordance with claim 1, wherein Co is further contained in said surface layer at a concentration higher than that of the interior.

13. The positive electrode active material for an alkaline storage battery in accordance with claim 12, wherein Ca is further contained in said surface layer at a concentration higher than that of the interior, and Mn is further contained in the interior at a concentration higher than that of the surface layer.

14. The positive electrode active material for an alkaline storage battery in accordance with claim 12, wherein Ca is contained in said surface layer at a concentration higher than that of the interior, and Mn is further contained in the interior at a concentration higher than that of the surface layer.

15. The positive electrode active material for an alkaline storage battery in accordance with claim 12, wherein Ca is contained in said surface layer at a concentration higher than that of the interior.

16. The positive electrode active material for an alkaline storage battery in accordance with claim 1, wherein both Ca and Y are contained in said surface layer at a concentration higher than that of the interior, and Mn, Al and Cr are contained in the interior at a concentration higher than that of the surface layer.

17. A positive electrode active material for an alkaline storage battery, said active material comprising particles of a nickle based multi-metals oxide, said nickle multi-metals oxide particles having an interior and a surface layer, said nickle based multi-metals oxide particles being porous in at least the surface layer, wherein an average composition of the surface layer is different from that of the interior in that at least one element selected from the group consisting of Ca, Ti, Zn, Sr, Ba, Y, Cd, Co, Cr, Bi and lanthanoids, in addition to Ni, is contained in the surface layer at a concentration higher than that of the interior, wherein the average composition of the interior is different from that of the surface layer in that at least one element selected from the group consisting of Al, V, Cr, Mn, Fe, Cu, Ge, Zr, Nb, Mo, Ag, Sn, Sb and W, in addition to Ni, is contained in the interior of said nickle based multi-metals oxide particles at a concentration higher that of the surface layer, and wherein said active material is based on nickle hydroxide and is capable of reversibly cycling between beta- and gamma-nickle hydroxide crystalline phases during electrochemical charge and discharge.

18. The positive electrode material for an alkaline storage battery in accordance with claim 17, wherein an average amount y of the whole metallic elements except for Ni contained in the interior of said nickel based multi-metals oxide except for the surface layer is within the range represented by the following formula:

$$0.01 \leq y \leq 0.35$$

when the number of atoms of the total metallic elements containing Ni is 1.

19. A positive electrode active material for an alkaline storage battery, said active material comprising particles of nickel based multi-metals oxide, said nickel based multi-metals oxide particles having an interior and surface layer, said nickel based multi-metals oxide particles being porous in at least the surface layer, wherein the average composition of the interior is different from that of the surface layer in that at least one element selected from the group consisting of Al, V, Cr, Mn, Fe, Cu, Ge, Zr, Nb, Mo, Ag, Sn, Sb and W, in addition to Ni, is contained in the interior of said nickel based multi-metal oxide particles except for the surface layer at a concentration higher than that of the surface layer, and wherein said active material is based on nickel hydroxide and is capable of reversibly cycling between beta- and gamma-nickel hydroxide crystalline phases during electrochemical charge and discharge.

\* \* \* \* \*